United States Patent [19]

Bitner

[11] Patent Number: 5,210,829
[45] Date of Patent: May 11, 1993

[54] ADJUSTABLE THRESHOLD FOR BUFFER MANAGEMENT

[75] Inventor: Haim Bitner, Framingham, Mass.

[73] Assignee: Digital Equipment Corporation, Maynard, Mass.

[21] Appl. No.: 626,793

[22] Filed: Dec. 12, 1990

[51] Int. Cl.⁵ .............................................. G06F 13/00
[52] U.S. Cl. .................................... 395/250; 395/425; 360/31
[58] Field of Search ................ 364/DIG. 1, DIG. 2; 395/250, 275, 425; 360/39, 51, 31, 55

[56] References Cited

U.S. PATENT DOCUMENTS

| | | | |
|---|---|---|---|
| 4,040,026 | 8/1977 | Gernelle | 395/275 |
| 4,378,588 | 3/1983 | Katzman et al. | 395/275 |

Primary Examiner—Robert L. Richardson
Attorney, Agent, or Firm—William P. Skladony; Barry N. Young

[57] ABSTRACT

This invention relates to a tape drive with an electronic buffer which temporarily stores data transferred between the host computer and the tape drive's magnetic tape. More specifically, during a write transaction, in which data is transferred by the host computer to the tape drive for storage, the present invention involves the buffer having an adjustable threshold, or "watermark", which must be reached by the data stored in the buffer before the tape drive begins the operation of ramping the tape up to its write velocity so that it can record the data stored in the buffer. To the extent that the rate at which data is sent to the tape drive from the host computer may vary, the adjustment of the watermark by the tape drive is for the purpose of locating the watermark that is optimal for the data input rate at any given point in time. It does so with its chief objective being the maximization of the tape drives availability to accept data from the host computer whenever the host is ready to send data. A secondary objective, however, is to minimize the number of mechanical operations of the tape drive in the interest of decreasing, to the extent possible, the amount of physical wear on the tape and the tape heads. The invention is also implemented in read operations and works in the same basic manner and has the same objectives as discussed in connection with write operations.

53 Claims, 19 Drawing Sheets

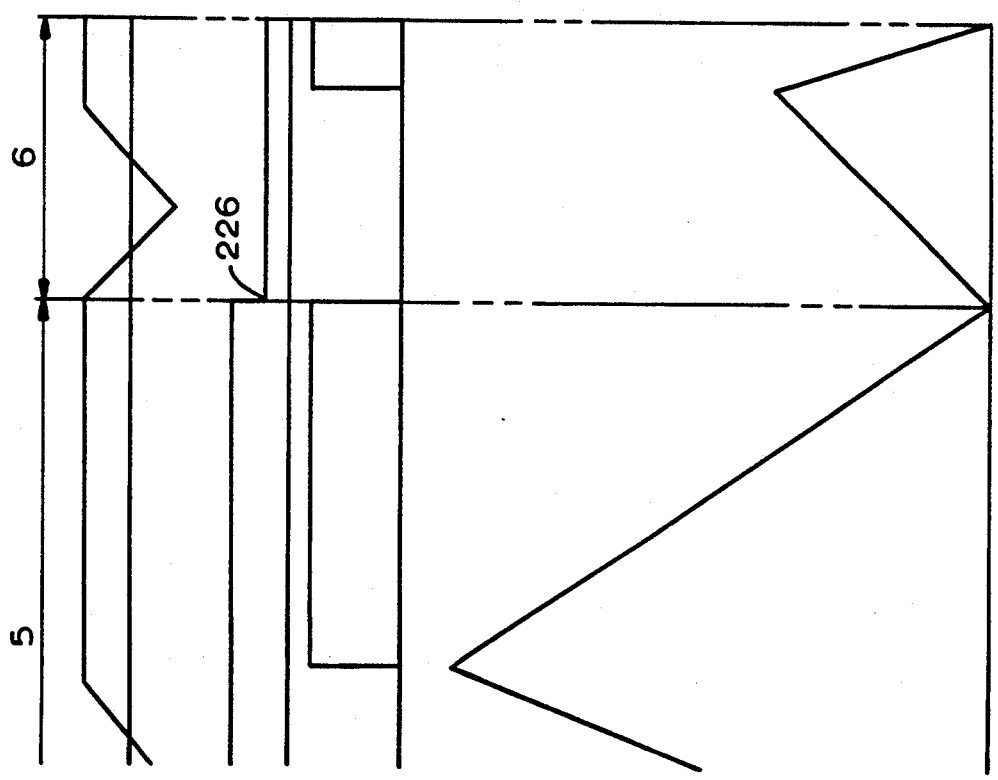

ADJUSTABLE THRESHOLD FOR BUFFER MANAGEMENT

FIELD OF THE INVENTION

This invention relates to a tape drive with a buffer which is used to temporarily store information transferred between a host computer and the tape drive, and more particularly the invention relates to the buffer having an adjustable watermark.

BACKGROUND OF THE INVENTION

Many modern computer systems employ a hierarchical approach to the storage of data by combining a main memory with auxiliary storage, such as disk drives and tape drives. Frequently, during its active processing function a host computer, made up of a central processing unit ("CPU") and a main memory, will access a disk drive for the purpose of transferring data which is no longer needed in main memory to the disk, or retrieving data which is needed in main memory from the disk.

A tape drive, on the other hand, is not typically used as an active storage resource, but rather is used as a back-up storage system. In other words, the storage of data on tape is generally for the purpose of creating a redundant or archival copy of the data stored on disk, rather than for the storage of data that will be regularly accessed during processing operations. Therefore, if the data stored elsewhere, such as on a disk, gets erased or corrupted, the tape copy can be accessed and the data can be recovered.

Consequently, of all the time during which the host interacts with a related tape drive, the vast majority will be spent writing data to the tape, while a relatively minor amount will be spent reading data from the tape. Reading usually only occurs when lost data needs to be recovered or archived data needs to be accessed.

In many system configurations, the data that is to be written onto the tape is first transferred to the host from the disk drive, and then sent by the host to the tape drive via the system bus. There are many tape drive systems which use large, mechanical motors for the movement of the tape; these are generally referred to as "start/stop tapes". The advantage of such large motors is that they can start and stop the tape almost instantaneously. Therefore, when a given package of data, referred to as a "block", is to be written onto the tape, the tape drive will be signaled by the host computer and the large motor will immediately wind the tape and ramp up to the constant velocity at which time data can be written onto the tape. That velocity is also the same velocity at which data is read from the tape, and so it is referred to as the "read/write velocity", or given that the greatest number of transactions are of the write variety, it may simply be referred to as the "write velocity". After the block is written, the tape will be stopped immediately, as well. When the next block is to be written onto the tape, the tape will again be instantaneously started without leaving any appreciable blank space on the tape between the first and second blocks. Consequently, start/stop tapes are capable of storing data as soon as the host is ready to send it, and the start/stop tape will not force the host computer to wait for the tape to get ready to receive the data, an event which is commonly referred to as a "host stall".

The disadvantage, however, of tape drives with large mechanical motors is that they take up a significant amount of physical space, and they are relatively expensive. Therefore, other tape drive systems use smaller, less expensive mechanical motors for the movement of the tape. One disadvantage of such smaller tape drives, referred to as "streaming tapes", is that because of the small motors the tapes cannot be started and stopped instantaneously. When a block is to be written, the tape will gradually ramp up to its write velocity, and then, when it is done writing, the tape will gradually slow down and stop. In order to prepare the tape for the next write operation, and in order to maximize the use of the storage space available on the tape, after the streaming tape stops it will actually rewind past the point at which the last block is stored on the tape. Therefore, when it next commences a write operation it will be able to ramp up to its write velocity while it winds the part of the tape on which the previous block has already been written. Through proper synchronization, by the time the tape drive reaches the blank portion of the tape on which the new block is to be written, it will have reached its write velocity.

Unlike the start/stop tape, a streaming tape is not capable of ramping up to its appropriate write velocity when the host computer first signals that it is ready to send data. This is because the small mechanical motor takes time to ramp up. Therefore, while the tape winding mechanism gradually increases its velocity, the host computer would be delayed while it waits for the tape drive to signal its availability. In order not to stall the host in this fashion, however, many tape drive controllers include a storage buffer, made up of an electronic memory, such as a random access memory ("RAM"). Thus, the host can immediately send the data to the tape drive, which will first be stored in the buffer, and then transferred to the tape when the tape reaches its write velocity. Buffers thereby improve the immediate storage capability of a streaming tape. It should be noted that although the cost of adding an electronic buffer to the tape drive is offset by the benefit of improved performance, RAM storage is relatively expensive. Therefore, there is a tendency to keep the size of the buffer as small as is consistent with overall design objectives, including cost.

In some system designs, as soon as any data arrives in the buffer the mechanical assembly which moves the tape across the tape heads will begin winding the tape, and after the tape reaches the necessary velocity, the data in the buffer can be written onto the tape and the buffer emptied. Other system designs do not begin the operation of the mechanical assembly as soon as data arrives in the buffer; rather, they have an established threshold which must be reached before the tape drive begins winding the tape. For example, one design may require that the amount of data in the buffer reaches the 60% full point before the mechanical assembly begins operation. This buffer data threshold at which the tape drive begins its winding operation is commonly referred to as a "watermark". In either case, whether the watermark is set low (or zero) or high, that watermark is fixed and unvarying within the given system.

On the other hand, the rate at which data is sent by the host computer is not fixed and will vary over time. In other words, the data may be "bursty", coming from the host in constantly changing data rates. This may be caused by any number of factors, such as the delay experienced by the host in getting data from the disk drive, interruption of the CPU by higher priority processing functions, unavailability of the system bus due to other modules using the bus, and the like.

Tape controller buffers which have fixed watermarks—such as a low or a high watermark—may encounter several problems as a result of the host computer sending data at varying rates. This is because a fixed watermark which is optimal for a slow data input rate may not work well with a fast input rate. For example, a buffer which has a fixed, zero watermark will commence winding the tape and reading the buffer at the first instant that data is transferred to the buffer. This low watermark tends to work well if the input data rate from the host computer is fast or high, relative to the rate at which data can be written onto the tape. On the other hand, if the rate at which data is being sent from the host is slow, it will not take the tape drive very long to empty the buffer. As soon as the buffer is emptied, the tape will stop, rewind, and reposition for the next write operation. Assuming that the host continues to write data into the buffer at the same slow rate, the tape drive will repeatedly empty an only partially full buffer, and repeatedly stop, rewind, and reposition.

Consequently, the tape drive will constantly be repositioning itself which has the effect of excessive mechanical wear on the tape, a phenomenon known as "shoeshine", and also excessive wear on the heads of the tape drive. Both of these are undesirable and costly effects of constant repositioning which results when a buffer with a low watermark receives data at a relatively slow rate. Therefore, although a low watermark may work well when the input data rate is high, it has substantial drawbacks when the input data rate is low.

As another example, a buffer which has a fixed, high watermark —such as 60%—will wait until the buffer is 60% full before it starts the mechanical assembly which moves the tape. In this instance, the fixed watermark setting tends to work well with slow data input rates. On the other hand, if the rate at which the data is being sent by the host is very high, relative to the rate at which data can be written onto the tape, then the mechanical tape drive assembly may not be able to reach its write velocity before the buffer reaches its full state. If that is so, and the buffer is filled before data can be written onto the tape, the tape controller will be forced to signal to the host that the buffer cannot accept anymore data, at least until some of the buffer is emptied. This will cause a host stall, which tends to degrade system performance.

Then, after the buffer is emptied, the tape will rewind and reposition itself. In the meanwhile, assuming that data is still being sent at a relatively high rate, the tape will not begin to ramp up until the buffer is 60% full, which will again result in the tape drive stalling the host because the buffer will fill and the tape drive will not be able to absorb all the data that the host is prepared to send.

Therefore, it can be seen that under certain circumstances buffers which have fixed watermarks, whether high or low, will precipitate undesirable consequences. Low fixed watermark buffers may cause excessive tape repositionings when their data input rate is low, resulting in excessive mechanical wear on the tape and tape heads; high fixed watermark buffers may cause the host computer to stall its delivery of data, resulting in a degradation in system performance.

Accordingly, it is an object of the present invention to have a tape controller buffer with an optimal watermark even though the rate at which data is written by the host computer may constantly vary. A feature of the invention, therefore, is to have an adjustable watermark, which continues to vary on the basis of whether the buffer was too full to accept data from the host at the time it commences a given write operation. It does so by referring back to the condition of the buffer during the previous write cycle. If the buffer was not completely filled, which means that the host computer was not kept waiting for the availability of the tape drive, then the watermark will be raised. If, however, the buffer was filled such that the host could not store any more data in it, then the watermark is lowered so that the tape winding mechanism will start the ramp up procedure sooner than it did during the previous write cycle. In this sense, the tape controller "learns" from the experience of the previous write cycle, and responds by adjusting the threshold.

It is also an object of the invention to implement the same adjustable threshhold or watermark for the buffer in connection with read operations. During read operations the watermark varies on the basis of whether the buffer could have been emptier before it commences a given read operation, otherwise its principles of operation are fundamentally the same as during write operations.

Advantages achieved by this invention include an improvement in the compatibility of the tape drive with a host computer which transfers data at varying rates. By having an adjustable watermark, the availability of the tape drive to accept data from or send data to the host can be increased which will result in fewer stalls of the host computer. Fewer stalls of the host by the tape drive will have a corresponding improvement on the overall system performance. Furthermore, due to its adaptability, the adjustable watermark will reduce the number of unnecessary repositionings of the tape, thereby reducing the mechanical wearing of the tape and the tape heads.

SUMMARY OF THE INVENTION

In accordance with the present invention, a streaming tape includes a tape drive controller with an electronic buffer. The buffer temporarily stores data that is being transferred between a host computer and a tape. During a write transaction, in which the host computer sends data to the tape for storage, the buffer receives that data sent over the system bus by the host computer, and it temporarily stores the data until the tape mechanism has ramped up to its write velocity. The buffer has an adjustable watermark which determines the level of data that must be present in the buffer before the mechanical assembly of the tape drive will begin to ramp the tape up to its write velocity. When the write velocity is achieved, the data in the buffer is transferred onto the tape, and the buffer is emptied so that it may receive additional data.

The tape drive controller includes a software program which is accessed by a microprocessor in the controller and which continuously monitors data transfers between the buffer and the tape drive to determine whether between the time the buffer was last emptied and the time when the next write operation commences the host computer was stalled in sending data to the tape drive because the buffer was full. If a stall results, then at the commencement of the given write operation the program lowers the watermark by a substantial margin, to improve the likelihood that the next write transaction will not result in a stall. On the other hand, if no stall results, then at the commencement of the given write transaction the program raises the watermark by a small margin, to improve the likelihood that the tape drive can operate more efficiently with a higher watermark. The relatively greater amount by which the watermark is lowered when a host stall occurs, as compared to the amount by which the watermark is raised when no stall occurs, reflects that the chief priority of the system design is to maximize tape drive availability so that the host is not stalled. The secondary objective is to reduce shoeshine on the tape and the wearing of the tape heads by minimizing the number of rewinds and repositions, but not at the expense of system performance.

By having an adjustable watermark, the disadvantages of the fixed watermark buffers have been overcome. Namely, fixed watermark systems tend to work well with certain input rates, but not others. To the extent that the data input rate from the host may vary, fixed watermark systems will not always work at their optimal capability, which may force the host to delay the transfer of data or cause excessive wear on the tape drive components, as discussed above. The adjustable watermark, on the other hand, will constantly seek the optimal level at which the watermark should be set for the given input rate. Thus, when the input rate varies, the watermark can vary accordingly to maximize the tape drive's availability to receive data from the host, and to minimize the repositionings which wear the components.

The invention has been discussed primarily in the context of a write operation because in most instances the tape drive has data written by the host computer onto the tape for archival storage purposes, and much less frequently has data read from the tape, as stated above. Write transactions are much more common than read transactions. Nevertheless, the adjustable watermark for the buffer is also implemented for read transactions in which the host computer reads data from the tape. In the read mode the operation of the invention is virtually the same as in the write mode; however, in the read mode the invention monitors the system to determine how low the level of data in the buffer should be before the tape mechanism starts ramping up the tape to refill the buffer with data that is going to be transferred to the host computer. Once again the primary objective is to make sure that the host computer is not kept waiting for data from the tape drive, while a secondary objective is to minimize the mechanical wearing of the tape drive components.

Other objects, features, and advantages of the invention will be further appreciated and better understood upon consideration of the following detailed description of the preferred embodiment, presented in conjunction with the accompanying drawings.

BRIEF DESCRIPTION OF THE DRAWINGS

FIGS. 2a and 2b, when set side by side lengthwise, form a timing diagram which shows curves depicting data transfer characteristics between a host computer, a buffer and a tape during a series of write operations, the buffer having a watermark fixed at 0 kilo bytes ("Kb").

DESCRIPTION OF THE PREFERRED EMBODIMENT

A more detailed understanding of the present invention may be had from the following description of the preferred embodiment to be understood in conjunction with the accompanying drawings. The specific values used herein for buffer levels, data rates, and the like, are given by way of example for the purpose of illustrating the invention. Accordingly, the principle underlying the invention can be applied in any number of different system configurations.

Figure 1:
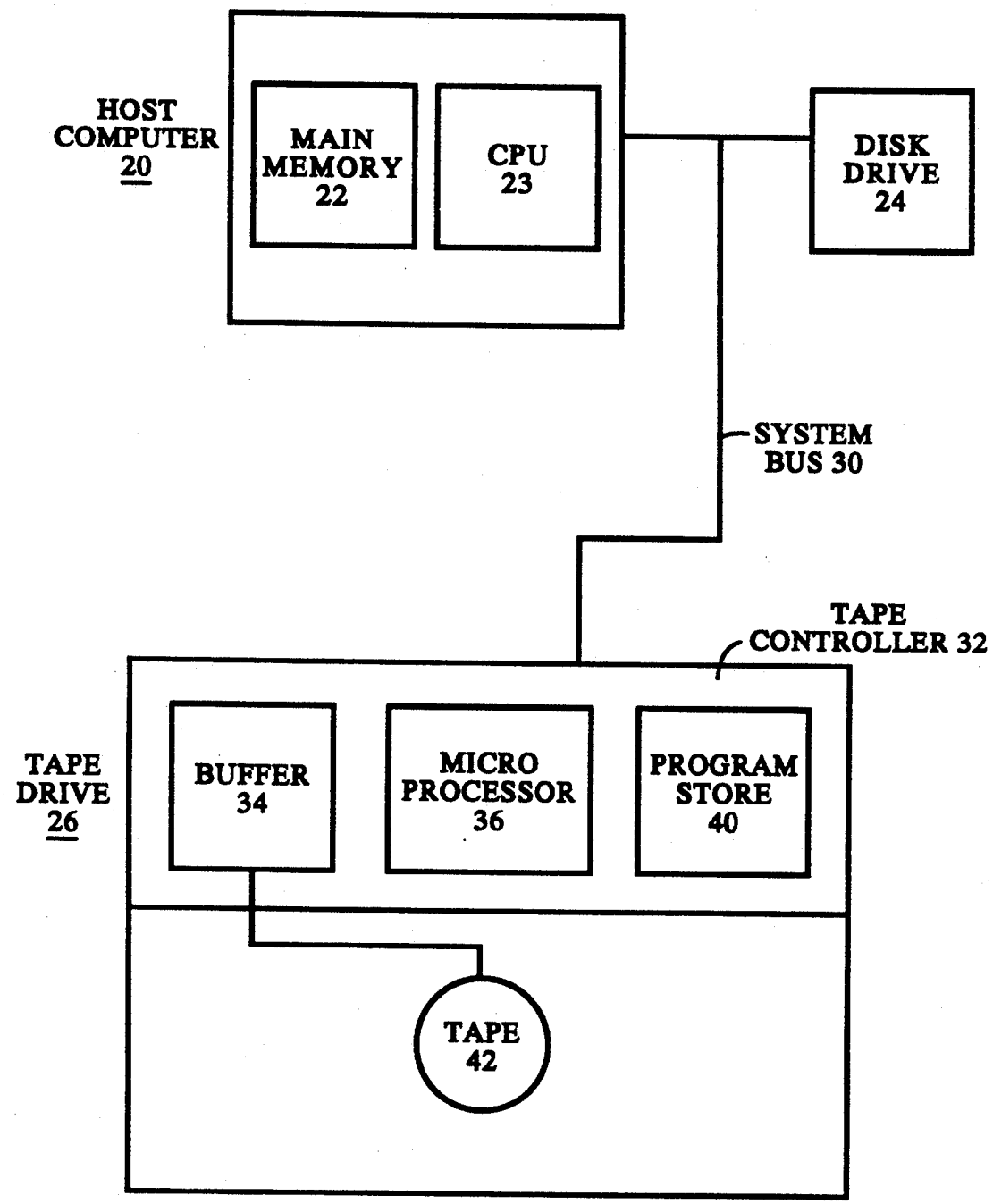
FIG. 1 is a block diagram of a host computer coupled with a disk drive and a tape drive.

Referring to FIG. 1, a host computer 20, including a main memory 22 and a central processing unit ("CPU") 23, is shown coupled to a disk drive 24 and a tape drive 26 over a system bus 30. Disk drive 24 contains data which is accessed by host computer 20 during its processing operations. On the other hand, tape drive 26 is typically used for auxiliary storage, meaning that it contains a redundant copy of data which is not usually accessed during active processing operations. Rather, the data stored on tape drive 26 is for back up storage purposes, meaning that it is typically accessed only when archived data needs to be retrieved because there are no other copies of that data in main memory 22 or on disk drive 24, or those other copies have been corrupted. In order to store data on tape drive 26, host computer 20 will retrieve that data from disk drive 24 and write it to tape drive 26 over system bus 30.

Tape drive 26 is a so-called "streaming tape", which means that it is characterized by a small mechanical motor and all of the features of a streaming tape discussed above. Tape drive 26 includes a tape controller 32 which contains an electronic storage buffer 34, made up of a RAM which can temporarily store data sent by host computer 20. In addition, tape controller 32 contains a microprocessor 36, which controls the operations of tape drive 26, and program store 40, which is another RAM storage for the software programs used by microprocessor 36 in order to perform its control function. Microprocessor 36 is also responsible for stalling host computer 20, in the event that tape drive 26 is not prepared to process a read or write transaction at the time that host computer 20 initiates that transaction.

Still referring to FIG. 1, tape drive 26 also contains tape 42, which is a typical, magnetic, computer tape on which data can be permanently recorded. Tape 42 is coupled to buffer 34 illustrating that data stored in buffer 34 can be written onto tape 42 and data stored on tape 42 can be read into buffer 34. Thus, buffer 34 serves as a temporary storage device for data written from host computer 20 to tape 42, as is most frequently the case, or read by host computer 20 from tape 42, while tape 42 is the permanent storage media. To the extent host computer 20 writes data to tape 26 much more frequently than it reads that data, the focus of the discussion of the preferred embodiment of the invention will be upon the operation of tape drive 26 during writing, but the operation of tape drive 26 during read operations will also be discussed below.

It should be noted that the present invention could be implemented in storage or recording means other than a tape drive. Devices which are suitable for the implementation of the invention are those in which the permanent storage or recording means require some period of time after the device is signaled to commence a data transfer, such as a read or write transaction, before the device can actually perform that transfer. That period of time will necessarily be greater than the period of time necessary for the temporary storage device associated with the permanent storage or recording means to commence the same data transfer. For example, referring back to the system shown in FIG. 1, tape 42 is the permanent storage means which takes some period of time to ramp up before it can perform a read or write operation. Buffer 34, the temporary storage device associated with tape 42, however, is capable of receiving or sending data in a much shorter time period because it does not have to go through a ramp up procedure. An example of a permanent recording device which could use the present invention would be a printer. Therefore, even though block 26 on FIG. 1 has been explained to illustrate the tape drive of the preferred embodiment, block 26 also represents other devices, such as a printer, which may implement the present invention. Any such alternate device would include some temporary storage medium, like buffer 34, and the control elements for operating the device, like tape controller 32. Furthermore, although block 20 has been explained to be a host computer, it also represents any host node which sends or receives information to and from a storage or recording device.

The system shown in FIG. 1 represents a wide range of streaming tapes, and will be used as the model for the discussion of FIGS. 2-7, below. In particular, the system shown in FIG. 1 will be used to represent a tape drive with a fixed 0 Kb buffer watermark, a fixed 430 Kb buffer watermark, and the adjustable buffer watermark of the present invention during both read and write operations. Although FIG. 1 will be used as the model system for the discussion of FIGS. 2-7, differences between the operation and performance of the systems will be discussed in detail in connection with these figures.

Finally, for ease of explanation the values used for buffer capacity and data rates are convenient, rounded numbers. As stated above, the invention can be applied to a wide variety of system configurations. In all three systems to be discussed, by way of example, the maximum capacity of buffer 34 is 500 Kb. The rate of transfer of data to and from host computer 20 can vary; however, for ease of illustration only 200 kilo bytes per second ("Kbps") and 500 Kbps are actually used in the discussion, with 200 Kbps given to represent a relatively slow data input rate, and 500 Kbps given to represent a relatively high input data rate. In all instances, data is transferred between buffer 34 and tape 42 during both read and write operations at the constant rate of 800 Kbps.

Figure 2A:
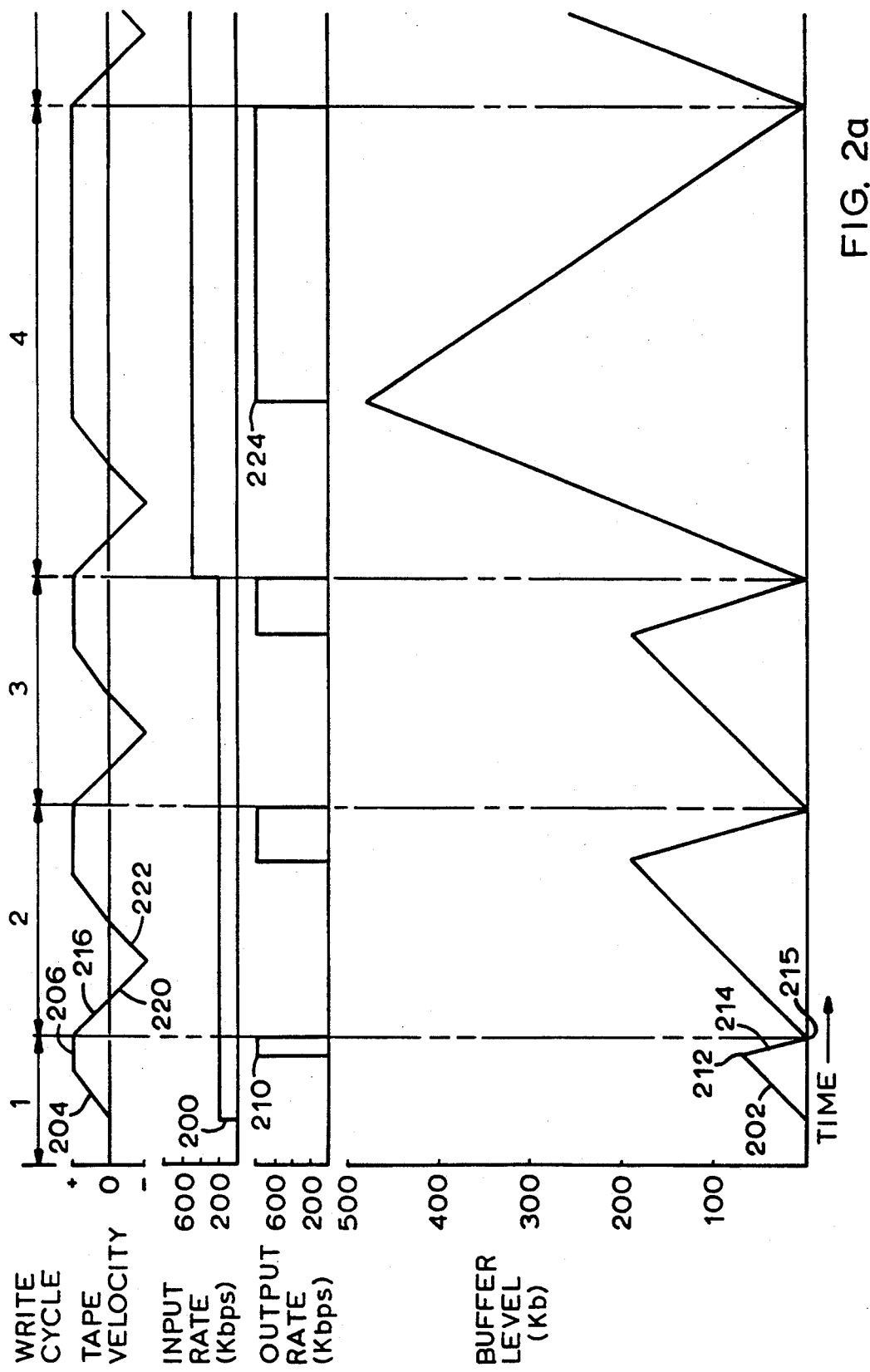

Now referring to FIG. 2, a timing diagram is shown representing the write cycles of tape drive 26, having a watermark, or buffer threshhold, fixed at 0 Kb. It should be noted that reference will be made throughout to the figures only by their numbers, such as "FIG. 2", and not by the reference number and letter, such as "FIG. 2a". This is because the figures are actually comprised of all of their respective sheets, and have only been separated onto individual sheets for purposes of formating.

Tape drive 26, shown on FIG. 2, will cause tape 42 to commence ramping up as soon as host computer 20 deposits any data in buffer 34. Shown along the y-axis of the diagram are five graph headings: "Write Cycle" identifying the number of a given write cycle (provided for the purpose of making it easier to identify and discuss different segments of the graph); "Tape Velocity" showing the speed and direction of tape 42; "Input Rate" showing the rate at which data is being sent by host computer 20 to tape drive 26 in Kbps; "Output Rate" showing the rate at which buffer 34 is transferring data onto tape 42 in Kbps; and "Buffer Level" showing the amount of data that is stored in buffer 34. The x-axis of the diagram is "Time".

As can be seen by referring to write cycle #1 on FIG. 2, as soon as data from host computer 20 is transferred to buffer 34, at the rate of 200 Kbps shown by the step increase of line segment 200 on the Input Rate line, the buffer level will simultaneously begin to increase at a linear rate, shown by line segment 202 on the Buffer Level line. In addition, given that buffer 34 has a fixed watermark of 0 Kb, as soon as any data is transferred to buffer 34, tape drive 26 will begin to wind tape 42 ramping it up gradually to its write velocity, shown by line segment 204 on the Tape Velocity line. After the write velocity is achieved, there will be a small delay before writing from buffer 34 actually occurs, due to the synchronization of microprocessor 36 with tape 42 to find the precise blank spot on the tape medium where the block can be written. The actual point of synchronization is shown by point 206 on the Tape Velocity line, which is coincident with the step increase on the Output Rate line shown by point 210, and the maximum point of fullness for buffer 34 shown by point 212 on the Buffer Level line. The coincidence of these points reflects that once the writing commences, at the output rate of 800 Kbps, buffer 34 empties as shown by the declining line segment 214 on the Buffer Level line. Eventually, buffer 34 is emptied, as shown by the intersection of the Buffer Level line with the Buffer Level x-axis at point 215 shown on FIG. 2 at the end of write cycle #1.

As shown in FIG. 2, even though buffer 34 was emptied, host computer 20 continues to send data to tape drive 26; therefore, buffer 34 again commences to fill as soon as it is emptied. Moreover, after buffer 34 is emptied during write cycle #1, tape 42 must gradually slow down and stop, as is shown by the declining line segment 216 of the Tape Velocity line, and its intersection with the Tape Velocity x-axis during write cycle #2. Then, tape 42 will gradually wind backwards, which is shown by line segment 220 of the Tape Velocity line extending under the Tape Velocity x-axis. Finally, it will slow down and stop its backward movement, which is again shown by the intersection of line segment 222 of the Tape Velocity line and the Tape Velocity x-axis.

Figure 3A:
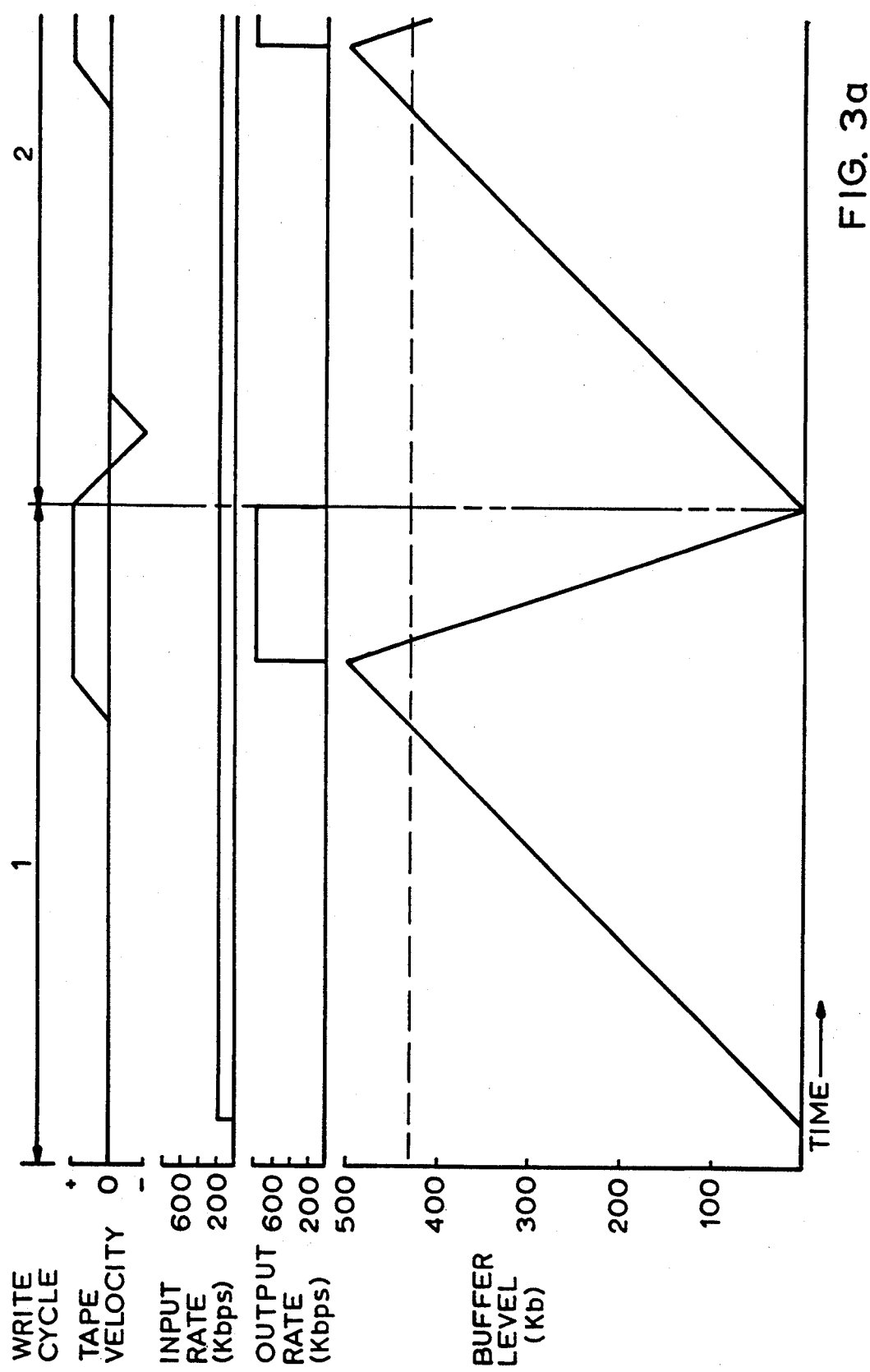
FIGS. 3a-3c, when set side by side lengthwise, form a timing diagram which shows curves depicting data transfer characteristics between a host computer, a buffer and a tape during a series of write operations, the buffer having a watermark fixed at 430 Kb.
Figure 3B:
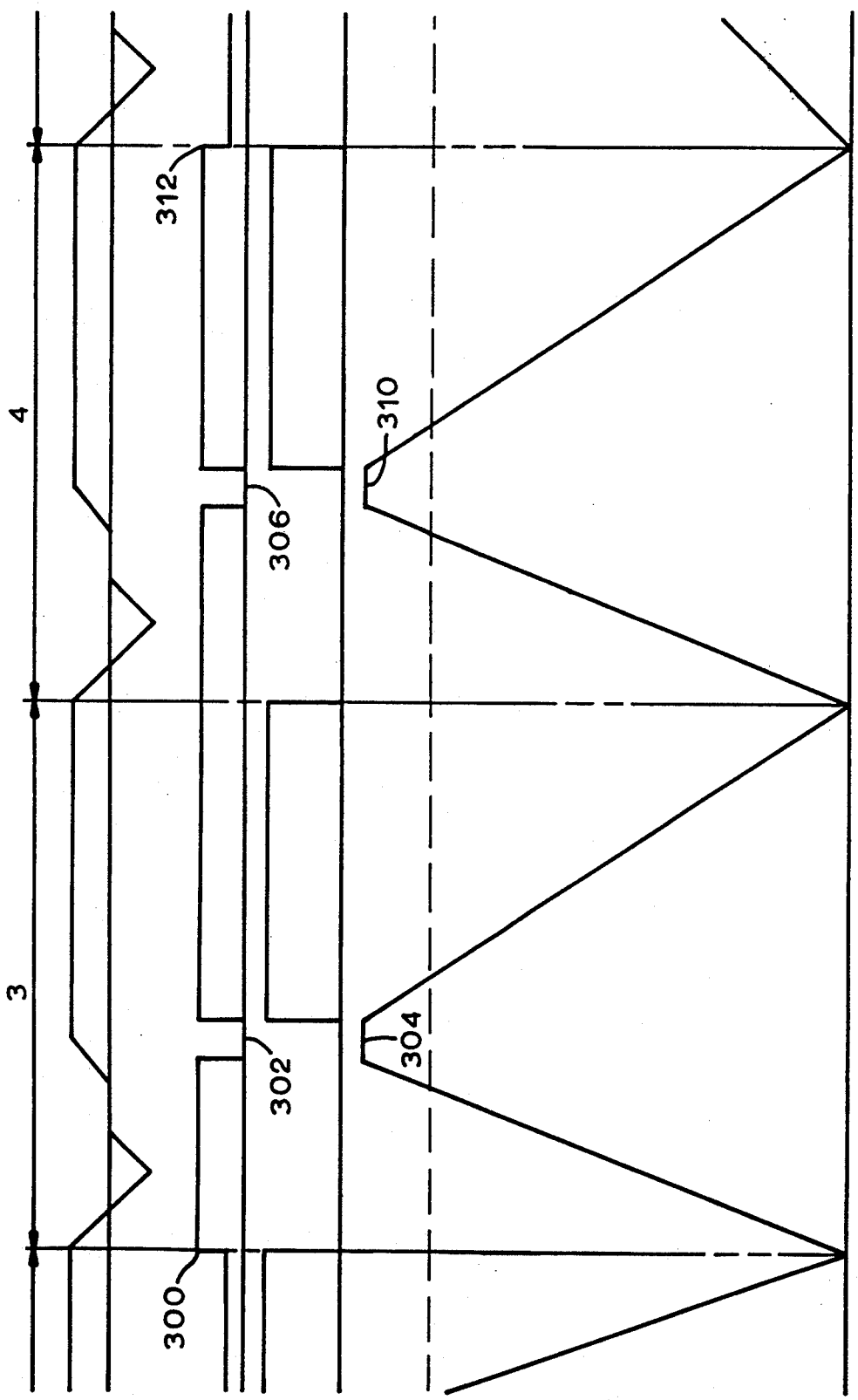
Figure 3C:
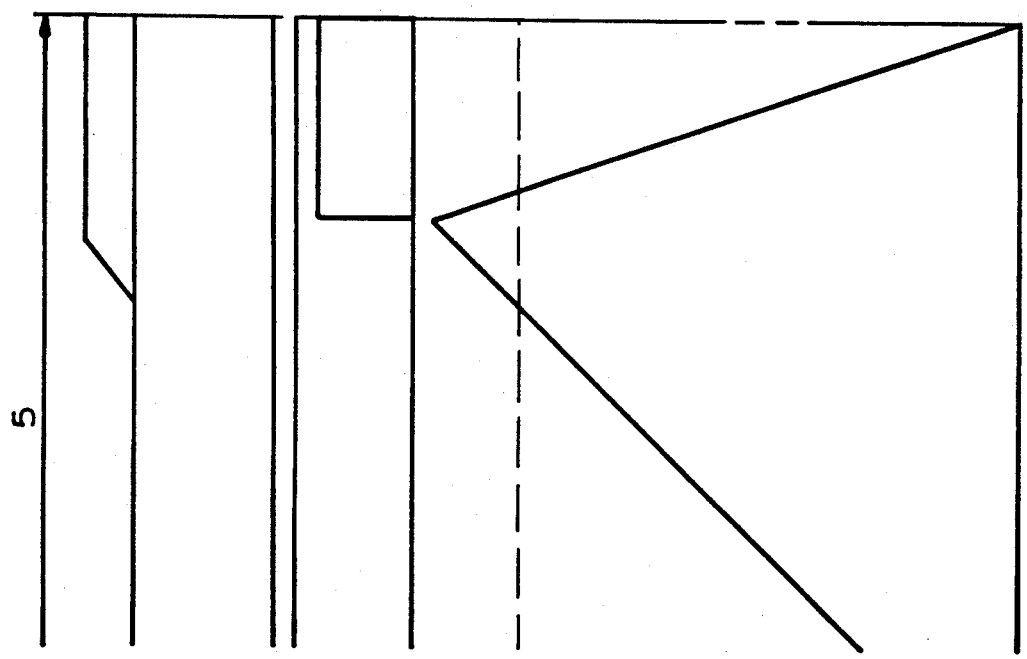
Figure 4A:
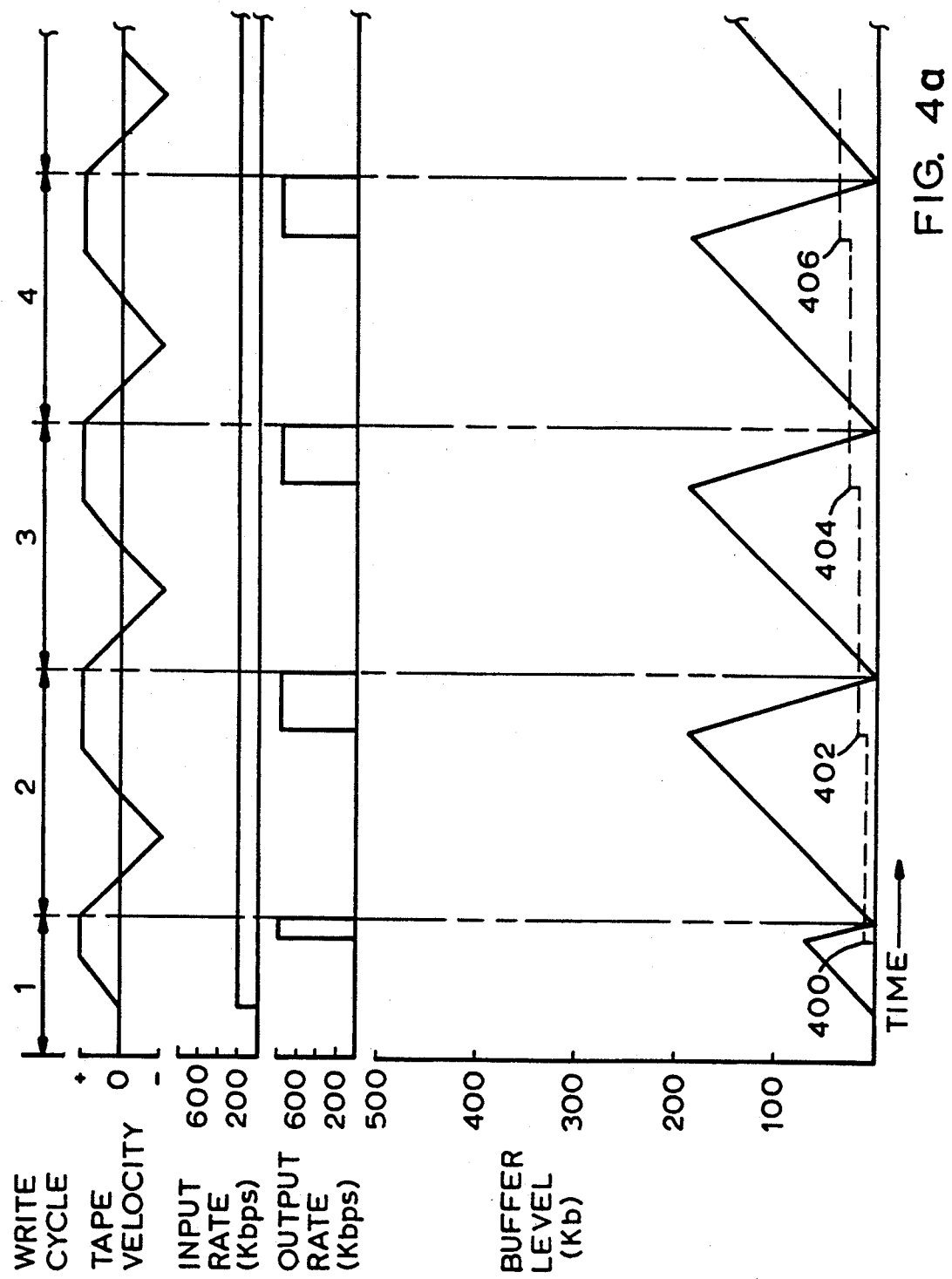
FIGS. 4a-4f, when set side by side lengthwise, form a timing diagram which shows curves depicting data transfer characteristics between a host computer, a buffer and a tape during a series of write operations, the buffer incorporating the present invention by having an adjustable watermark.
Figure 4B:
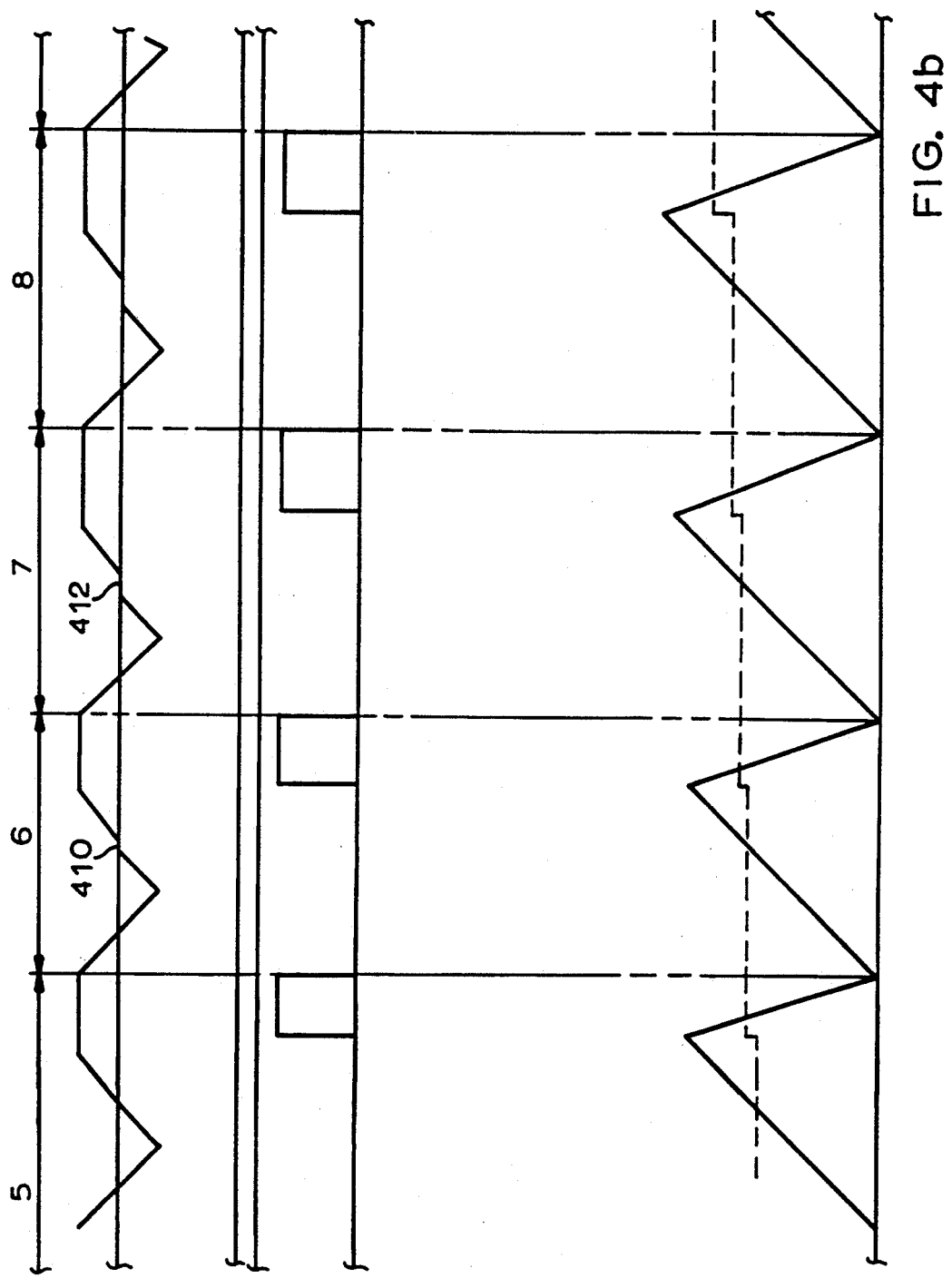
Figure 4C:
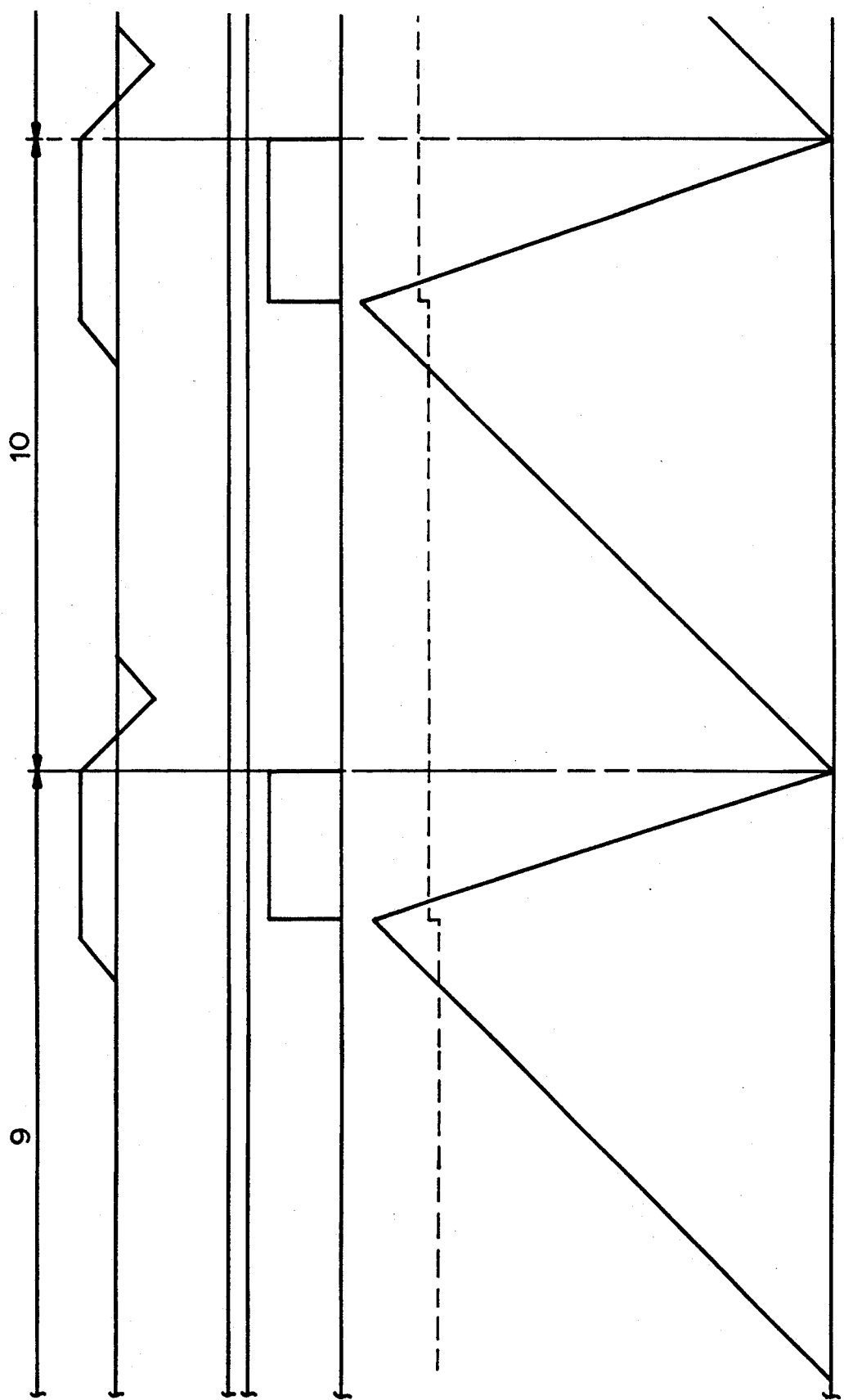
Figure 4D:
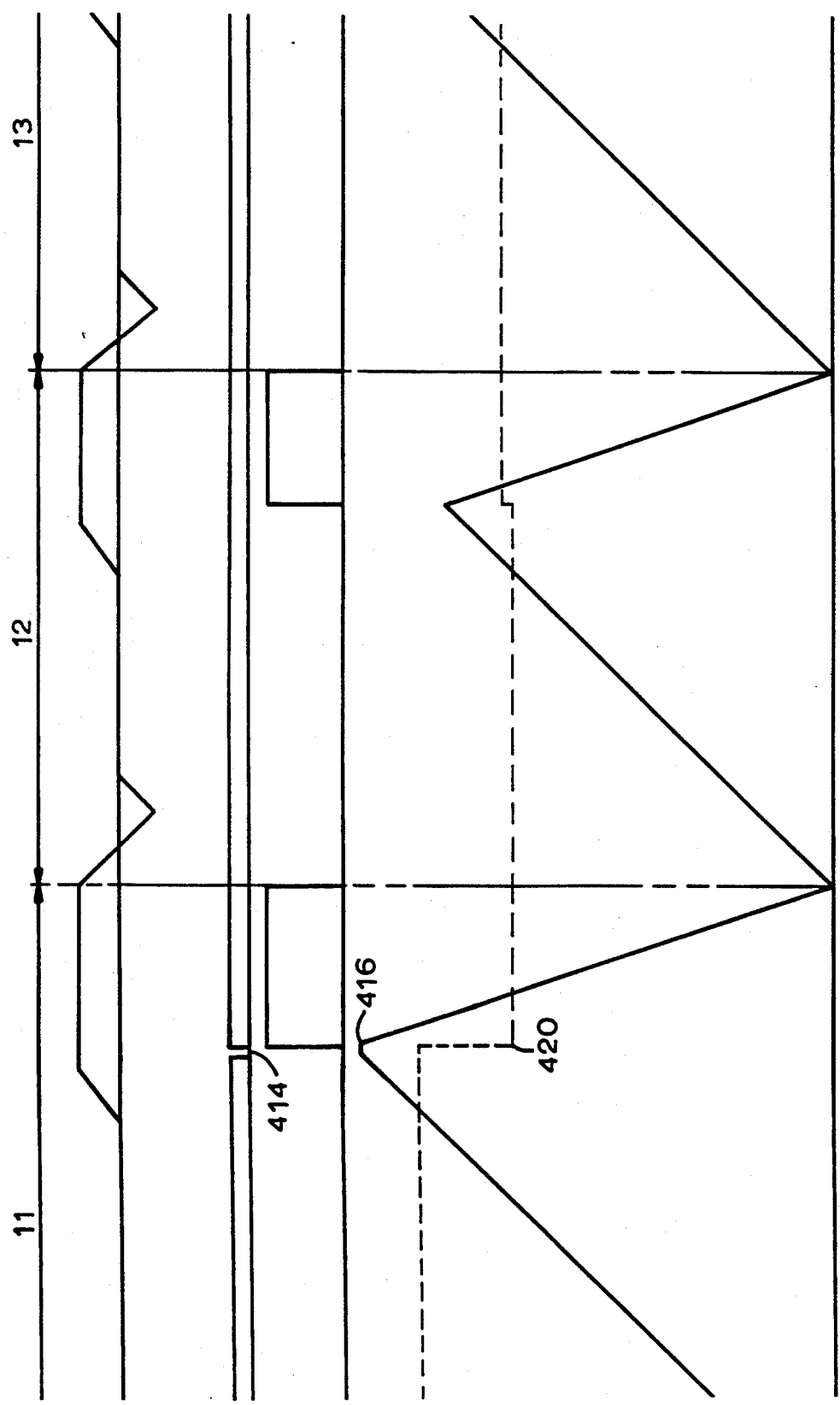
Figure 4E:
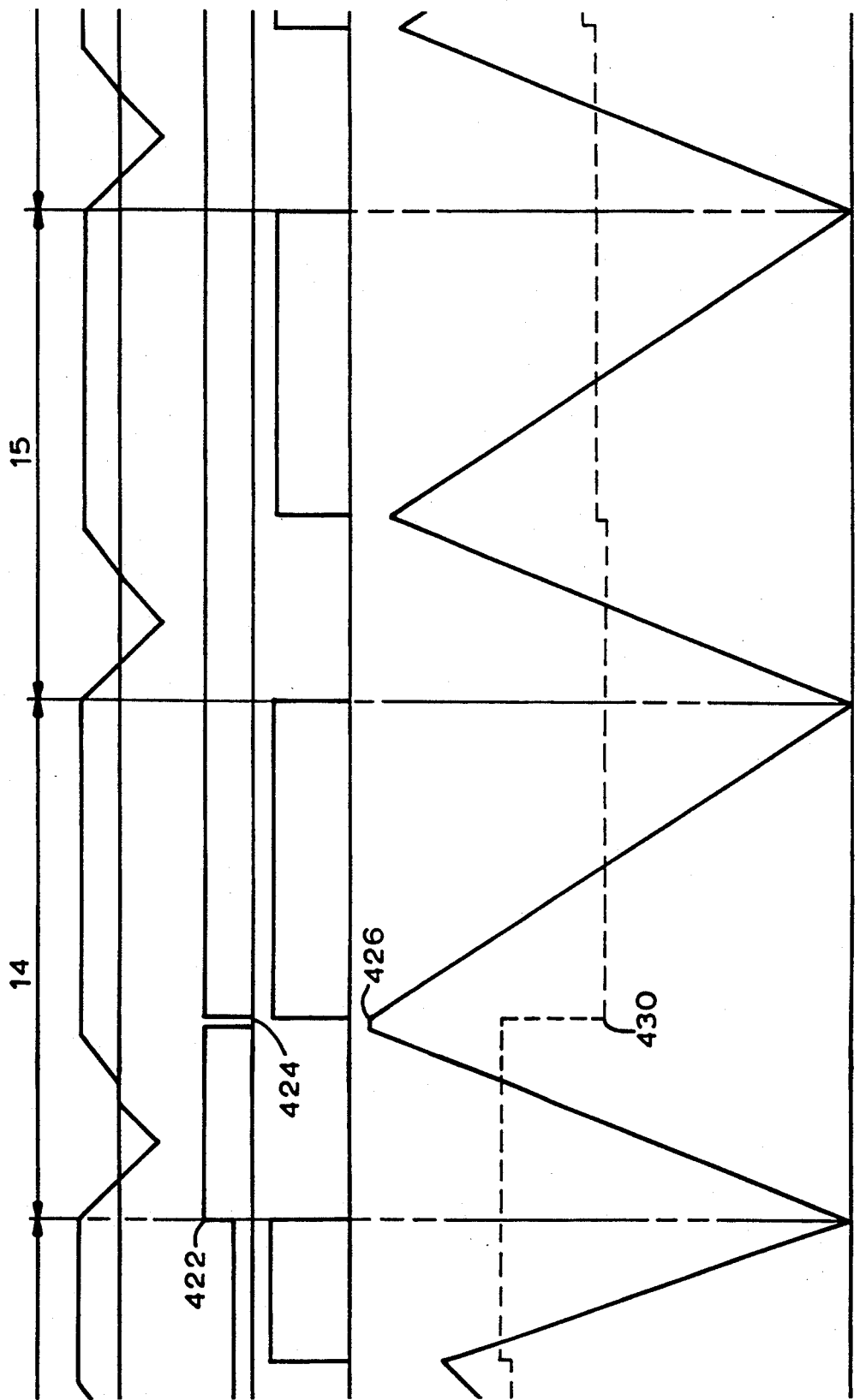
Figure 4F:
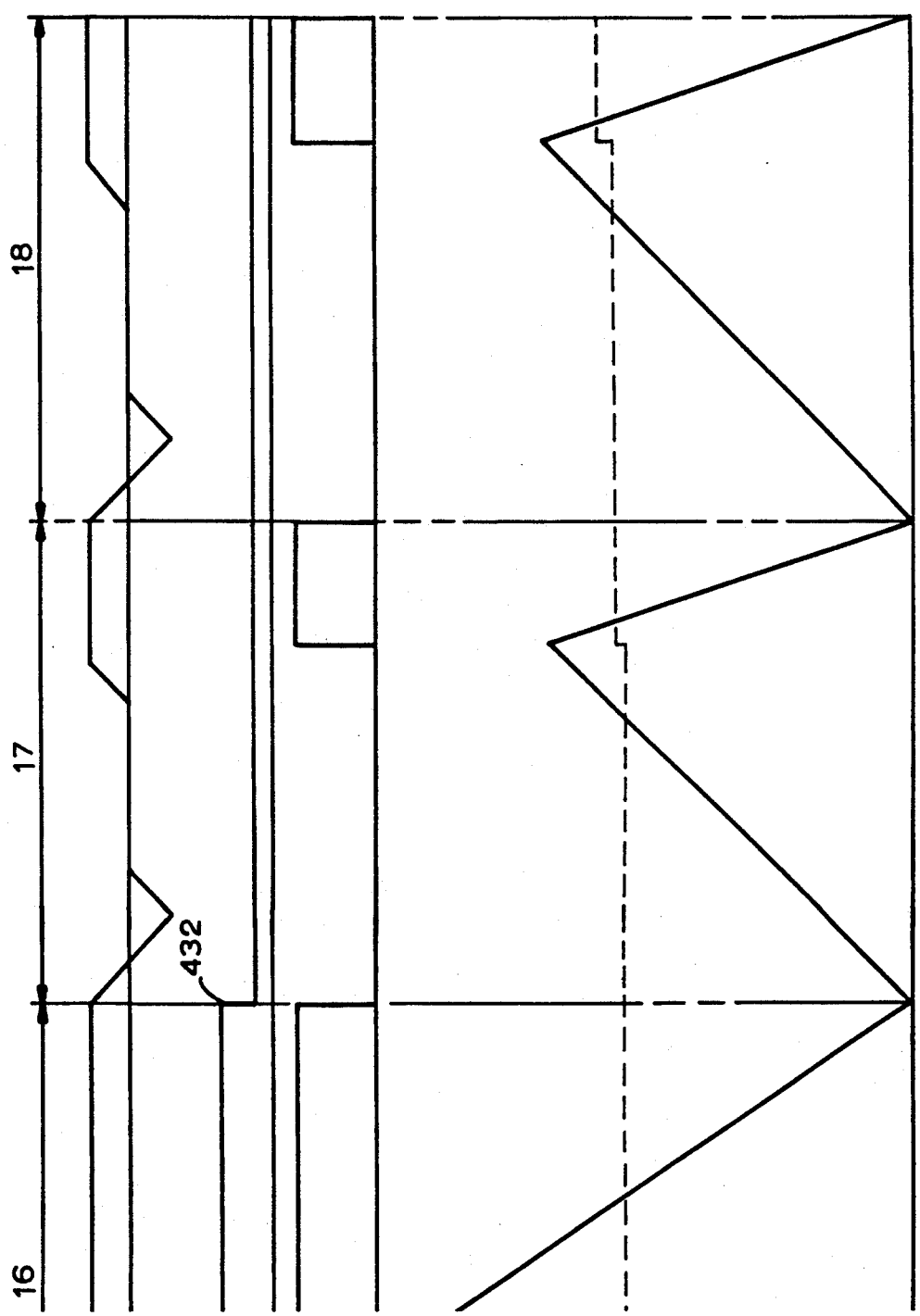

It should be noted for the purpose of understanding each of the timing diagrams showing write operations, FIGS. 2, 3, and 4, that in each of the write cycles the ramping up of tape 42, the filling of buffer 34, the transfer of data from the buffer 34 to tape 42, and the slowing and rewinding of tape 42 occurs in the same basic fashion. Therefore, those operations are reflected on FIGS. 2, 3, and 4 in the same basic graph pattern as shown and described during write cycles ##1 and 2 on FIG. 2.

In particular, as data goes into buffer 34, shown by a positive value on the Input Rate line, the Buffer Level line will simultaneously increase. When tape 42 commences its mechanical movement forward, it will be shown by an increase on the Tape Velocity line, which will eventually lead to a constant tape velocity shown by the leveling of the Tape Velocity line. At the point of synchronization, tape 42 will commence taking data from buffer 34 which will coincide with the a step increase in the Output Rate line, and also coincide with a decline in the Buffer Level line because buffer 34 is then being emptied. When the write operation is completed because all of the data in buffer 34 has been transferred to tape 42, the Tape Velocity line will start going down, which will coincide with a step decrease to zero in the Output Rate line, and also coincide with the Buffer Level line intersecting the Buffer Level x-axis indicating that buffer 34 is empty. To the extent these graph patterns are the same in each of the write cycles on FIGS. 2, 3, and 4, the coincidence of these various points will not be detailed again in connection with each write cycle.

During write cycle #2, buffer 34 fills during all of the time that tape 42 has been rewinding and repositioning, as well as the time that tape 42 has been ramping up and sychronizing. Therefore, during write cycle #2, the buffer achieves a level of 190 Kb, with the continuing input data rate of 200 Kbps, before buffer 34 is again emptied at the constant output rate of 800 Kbps. To the extent that during write cycle #2 buffer 34 was fuller than during write cycle #1, the write operation during write cycle #2 takes longer to complete than during write cycle #1.

As can be seen on FIG. 2, write cycle #3 is virtually identical to write cycle #2 given that the input rate and output rate and time periods are the same. Moreover, assuming that the input rate were to remain at 200 Kbps the tape drive would continue the same pattern of ramping up, writing, stopping, rewinding, and stopping as shown during write cycles ##2 and 3. Importantly, at this relatively low data rate, 200 Kbps, tape drive 26 which has a fixed 0 watermark, will go through a large number of tape rewinds relative to the amount of data that has been transferred. In fact, as soon as tape 26 finishes its movement from one write operation, without any delay it commences the movement for the next write operation.

Now referring to write cycle #4 on FIG. 2, the data input rate has increased to 500 Kbps at point 224. Data is therefore being sent to the buffer at a faster rate than before. Accordingly, during write cycle #4 buffer 34 achieves a level of 475 Kb before the write operation commences and buffer 34 is emptied. In this instance, the emptying of buffer 34 again takes even longer at the constant output rate of 800 Kbps, which is shown by the longer data output rate line. Write cycle #5 is virtually identical to write cycle #4, and if the data input rate continued to be 500 Kbps, then subsequent write cycles would have the same characteristics as write cycles ##4 and 5. Instead, in the beginning of write cycle #6 the input rate drops again to 200 Kbps, shown at point 226, and the characteristics of the timing diagram will repeat the same pattern as shown during write cycles ##2 and 3.

Now comparing the operation of the 0 Kb watermark buffer at the two different data input rates, it can be seen that tape drive 26 operates more efficiently when the data input rate is high, rather then low. For example, during write cycles ##1-3, when the input level was 200 Kbps, tape drive 26 data with three repositionings of tape 42. During write cycle ##4 or 5, either of which last approximately as long as the first three write cycles together, when the data input rate was 500 Kbps, tape drive 26 transferred data with only one repositioning. In this sense, the 0 Kb watermark buffer is more optimally designed to accommodate high data input rates because it can transfer more data with fewer starts and stops of the tape mechanism. This, of course, has the cumulative benefit over time of less wear on the components of the tape assembly.

Referring now to FIG. 3, another timing diagram is shown representing a system which is the same as that represented in FIG. 1; however, in this instance buffer 34 has a watermark fixed at 430 Kb. Therefore, the mechanical motor of tape 42 will not begin ramping up to write until 430 Kb of data have been deposited into buffer 34. FIG. 3 follows the same format as FIG. 2, showing the "Write Cycle", "Tape Velocity", "Input Rate", "Output Rate", and "Buffer Level" graphed along the y-axis, and "Time" graphed along the x-axis. One difference between FIGS. 2 and 3, however, is that the fixed 430 Kb watermark of the system shown in FIG. 3 is represented by a dashed line which extends across the graph in the Buffer Level section.

As shown in FIG. 3, during write cycle #1 data starts coming into buffer 34 at the rate of 200 Kbps, but tape 42 remains idle until buffer 34 reaches a level of 430 Kb. At that point, tape 42 begins to ramp up and achieve its write velocity, and after reaching its write velocity some time will pass before sychronization occurs, the same as discussed in connection with FIG. 2. Coincidentally, due to the input data rate, buffer level and buffer watermark chosen in this example, at the very instant that the buffer level reaches 500 Kb, tape drive 26 begins transferring the data in buffer 34 onto tape 42 at the rate of 800 Kbps. Therefore, even though buffer 34 reached its maximum level, 500 Kb, during write cycle #1, buffer 34 began being emptied at the very moment the maximum was achieved, resulting in host computer 20 not stalling in its delivery of data.

Given that after write cycle #1 data is still coming into buffer 34 at the input rate of 200 Kbps, buffer 34 again begins to fill the same as during write cycle #1. In fact, write cycles ##1 and 2 are identical. Importantly, they show the operation of buffer 34 with a watermark that is fixed at a relatively high level, namely 430 Kb in a 500 Kb capacity buffer, while the data input rate is relatively low, namely 200 Kbps. During these two cycles, the system performs well in that a large quantity of data is written with only two repositionings of the tape, which minimizes the wearing of the tape and tape heads. Therefore, it can be seen that a high fixed watermark buffer tends to work well with a low data input rate, because the number of repositions are few and the host is not stalled.

Commencing with write cycle #3 in FIG. 3, the data input rate has gone up to 500 Kbps at point 300, which is the same as the input rate change that was shown in connection with the discussion of FIG. 2. Buffer 34 fills faster, which is reflected in the steeper incline of the Buffer Level line when comparing write cycle #3 with write cycles ##1 or 2. Although the data input rate went up, the watermark of buffer 34 remains fixed at 430 Kb and also the amount of time it takes tape 42 to ramp up and synchronize remains fixed. Therefore, as data fills in buffer 34 faster, but tape 42 still requires the same, fixed amount of time to prepare to write, during write cycle #3 tape drive 26 is not able to absorb all of the data which host computer 20 wants to send. This inability to accommodate all of the data results in a host stall which is shown by the drop to 0 Kbps of the Input Rate line at line segment 302. Also, as reflected in the flat segment of the Buffer Level line at line segment 304, the buffer level remains at 500 Kb during that same period of time. Finally, when tape 42 has ramped up and synchronized, data will be written out of buffer 26 at a constant output rate of 800 Kbps until buffer 34 is emptied.

Write cycle #4 shows the same characteristics of the system as is shown in write cycle #3. Again, because the commencement of the winding of tape 42 is delayed until 430 Kb are stored in buffer 34, tape drive 26 will not be able to accept all of the data which host computer 20 wants to send, resulting in another host stall, shown by a drop to 0 Kb on the Input Rate line at line segment 306 and the flattening of the Buffer Level line at line segment 310. Finally, at the end of write cycle #4 the data input rate drops back to 200 Kbps at point 312, at which time the system continues to operate in the same fashion as discussed above in connection with the write cycles ##1 and 2 of FIG. 3.

Comparing the operation of the fixed 430 Kb watermark system under a low and a high data input rate, it can be seen that the fixed 430 Kb watermark operates optimally with a relatively low data input rate. Specifically, when the input rate was 200 Kbps, during write cycles ##1, 2, and 5, tape drive 26 was always available to accept data from host computer 20, and there were a minimum number of rewinds of the tape. On the other hand, when the input rate increased to 500 Kbps, during write cycles ##3 and 4, tape drive 26 was not fast enough to absorb the data, due to the necessary ramping and sychronizing of tape 42. Therefore, host stalls occur which have a tendency to degrade overall system performance.

Now summarizing the operation of the systems discussed in connection with FIGS. 2 and 3, it is evident that a buffer with a fixed, low watermark, such as 0 Kb, is best suited to operate with a high data input rate because under those conditions it does not cause host stalls and tape starts and stops are kept to a minimum. The same buffer with a low data input rate, however, causes too many repositions and never takes advantage of the buffer's maximum capacity. On the other hand, a buffer with a fixed, high watermark, such as 430 Kb, is best suited to operate with a low data input rate because it maximizes the use of the buffer capacity without causing host stalls. The difficulty experienced by both such systems, however, is that although both the high and low fixed watermark buffer work well with a specific data input rate, the data input rate of the typical host computer can constantly vary. As a result of that varying rate, the system which worked well with one rate may not work well with the other.

The present invention overcomes these disadvantages by implementing a watermark that constantly adjusts up or down so that as the data input rate changes, the watermark of the buffer changes as well. Therefore, the invention combines the advantages of having a low watermark when the data input rate is high with the advantages of a high watermark when the data input rate is low. The purpose behind these up and down adjustments being to maximize the availability of tape drive 26 to receive data from host computer 20, whenever host computer 20 is ready to send data, and also to minimize the mechanical repositioning of tape 42 in the interest of avoiding unnecessary wearing of the tape and the tape heads.

Referring back to FIG. 1 to discuss the present invention in greater detail, a further control function provided by microprocessor 36 is to establish and responsively adjust the "watermark" or threshhold level of buffer 34. It does so by running a C language software program which is stored in program store 40, along with the other software that is used by microprocessor 36. The details of the program logic will be discussed in connection with the software flow diagram of FIG. 5.

Generally stated, the microprocessor and the program is to constantly question at the commencement of a given write operation whether host computer 20 was stalled in sending data to tape drive 26 because buffer 34 was too full to accept any more data at any time between the time buffer 34 was last emptied and the commencement of the write operation. If buffer 34 was too full, then the program causes microprocessor 36 to lower the buffer level by a large amount, such as for example 100 Kb, in order to increase the probability that a host stall will not occur during the next write cycle. If a host stall again occurs during that next write cycle, then the buffer will again be lowered until a write operation is completed without a host stall. On the other hand, if buffer 34 was not too full, and did not cause a host stall, then microprocessor 36 will increase the buffer level by a small amount, such as for example 10 Kb, and continues increasing the watermark after each write operation which did not result in a host stall.

Now referring to FIG. 4, a timing diagram using the same format as in FIGS. 2 and 3 is shown illustrating a buffer with an adjustable watermark, in accordance with the present invention. Moreover, in order to best illustrate the invention, FIG. 4 shows the operation of tape drive 26 from the time it is powered up and performs its first write operation. Therefore, at the commencement of write cycle #1, the watermark will originally be set at 0; however, it will be seen that it advances from that point during subsequent write operations.

Commencing with write cycle #1 of FIG. 4, the input data rate from host computer 20 is relatively low, 200 Kb, the same beginning rate as used in connection with the above discussion of the buffers with watermarks fixed at 0 and 430 Kb. Given that after power up the watermark is initially set to 0, the mechanical motor of tape drive 26 commences the winding of tape 42 as soon as any data is deposited in buffer 34. Therefore, as soon as the data input starts, so too does the ramping up of tape 42. When tape 42 reaches its write velocity and has synchronized, data will be written from buffer 34 onto tape 42.

As can be seen by comparing the first several write cycles of FIG. 4 with the first several write cycles of FIG. 2, the performance of the buffer with an adjustable watermark and a buffer with a watermark fixed at 0 are quite similar; therefore, the filling and the emptying of buffer 34 during write cycles ##1–4 of FIG. 4 will not be discussed in detail here, given that it is virtually the same as the discussion with respect to FIG. 2.

An important difference, however, is that at the commencement of each write operation, which occurs just as the buffer level begins to go down, tape drive 26 will question whether host computer 20 was stalled with data at any earlier point in time since buffer 34 was last emptied, and adjust the watermark up by 10 Kb or down by 100 Kb depending upon its findings. During write cycle #1, the watermark was originally set at 0 and host computer 20 was not stalled; therefore, at the commencement of the write operation of write cycle #1 the watermark has been adjusted upward to 10 Kb, shown by point 400. Similar to FIG. 3, FIG. 4 includes a dashed line in the Buffer Level section to represent the level of the watermark of buffer 34. During write cycles ##2, 3, and 4, host computer 20 was also not stalled, and therefore the watermark was increased progressively from 10 Kb, to 20 Kb, to 30 Kb, and finally to 40 Kb (shown by points 402, 404, and 406, respectively) before the graph on FIG. 4 is broken.

Through these first four write cycles it can be seen that although the watermark is increasing, the buffer level remains at 190 Kb (except for write cycle #1). This is because even though the watermark is increasing it is doing so at small enough increments, such that during these early cycles the level of data in buffer 34 has already reached the watermark by the time tape 42 has completed its rewinding operation from the previous write cycle. Consequently, as soon as tape 42 is rewound and stopped it immediately commences ramping up to its write velocity to undertake the next write operation. During these first four write cycles there are a large number of repositionings of the tape; however, due to the increasing watermark, tape drive 26 is moving toward improved efficiency, which can be seen in the next segment of FIG. 4.

After the break in the graph and commencing with write cycle #5, the adjustable watermark is shown to have increased to 120 Kb, which eventually happens as the progression shown during write cycles ##1–4 continues. The data input rate continues at 200 Kbps. Continuing the same performance pattern discussed above, when there is no host stall during write cycle #5, the watermark gets advanced from 120 Kb to 130 Kb. As a result of this increase there is now a very brief pause between the repositioning and stopping of tape 42, shown by line segment 410 on the Tape Velocity line, after the write operation commenced in write cycle #5, and the ramping of tape 42 during write cycle #6. This is because the watermark of 130 Kb, established during write cycle #5, had not been achieved by the time tape 42 had rewound and stopped during write cycle #6. Therefore, for a short time the tape mechanism remained idle as buffer 34 continued to fill to its 130 Kb threshold. As soon as that watermark was reached, tape 42 ramped up and wrote the data, and buffer 34 was emptied.

Again, because host computer 20 was not kept waiting with data, the watermark is advanced to 140 Kb at the commencement of the write operation undertaken during write cycle #6. Consequently, during write cycle #7 it takes longer for the watermark to be reached, resulting in even more time elapsing, shown by line segment 412 on the Tape Velocity line, between the stopping of tape 42 after the write operation which takes place during write cycle #6 and the starting of tape 42 for the write operation which takes place during write cycle #7. An identical progression is shown in comparing the operation of tape drive 26 during write cycles ##7 and 8.

It can be seen by looking at the progression between write cycles ##5–8 that as the watermark increases, the delay between stopping tape 42 after one write operation and starting tape 42 for the next write operation also increases. This is significant because as that delay increases it correspondingly means that tape drive 26 is going through fewer repositions, which is one of the objects of the invention because it has the beneficial effect of reducing the physical wearing on the mechanical components of tape drive 26.

FIG. 4 has a second break after write cycle #8; however, the progression shown from write cycle #5 through write cycle #8 illustrates that, provided the data input rate remains 200 Kbps, the adjustable watermark will continue to increase.

After the second break in FIG. #4, the watermark is shown to be set at 420 Kb at the commencement of write cycle #9. At this point it can be seen that the adjustable watermark buffer is operating similar to a buffer with a high fixed watermark, such as the buffer with the watermark fixed at 430 discussed in connection with FIG. 3. In particular, the tape operations—such as ramping up, writing, stopping, rewinding, and stopping—are at a minimum, which is reflected in the relatively wide spacing between tape activities on the Tape Velocity line during write cycles ##9-11. Therefore, although the original setting of the watermark was low, which caused an excessive number of tape repositionings, the system has adjusted to the low data input rate by raising the watermark to minimize the physical wearing of tape 42.

Similar to the operations discussed above, after the write operation which occurs during write cycle #9, the watermark will be adjusted up to 430 Kb, given that no host stall occurred. Therefore, during write cycle #10, tape 42 does not begin winding until 430 Kb are deposited in buffer 34. At this watermark, buffer 34 is filled to its capacity, 500 Kb, at the very instant that the write operation commences emptying buffer 34. Given that no host stall occurred during write cycle #10, the watermark is advanced to 440 Kb, which has the effect of causing a host stall during write cycle #11. As can be seen by referring to the Input Rate line, the data input drops to 0 Kbps at line segment 414 for a short time as tape 42 was still ramping up and synchronizing. During this delay period, the buffer level remains flat at 500 Kbps shown by line segment 416 on the Buffer Level line.

In accordance with the present invention, as a result of this host stall, the watermark will be dropped by a relatively large amount, namely 100 Kb. The difference between the relatively small increases of the watermark when there have been no stalls, as compared to the relatively large decreases when there has been a stall reflects that a greater premium is placed on having tape drive 26 available to accept data from host computer 20, even if it results in somewhat greater number of tape rewindings.

Referring now to write cycle #11 of FIG. 4, it can be seen that as a result of the host stall, during write cycle #11 the watermark is dropped from 440 Kb to 340 Kb, shown by point 420. Thereafter, during write cycles ##12 and 13, which do not cause host stalls, the watermark will again continue to advance to 350 Kb and 360 Kb, respectively. If the data input rate continued to be 200 Kbps, then the watermark would continue to hover between 340 Kbps and 440 Kbps, taking maximum advantage of the full capacity of buffer 34 and minimizing wearing of the tape and the tape heads.

Consistent with the exemplary operations discussed in connection with FIGS. 2 and 3, FIG. 4 also shows the data input rate increasing to 500 Kbps at the commencement of write cycle #14, shown by point 422, when the adjustable watermark is set at 360 Kbps. Because the buffer level was relatively high when the data input rate increased to 500 Kbps, during write cycle #14 there is another host stall, shown by the Input Rate line dropping to 0 Kb at line segment 424 and the flattening of the Buffer Level line at line segment 426. In response, tape drive 26 will again drop the watermark of buffer 34 from 360 Kb to 260 Kb, as shown by point 430.

As shown during write cycle #15, the 260 Kb buffer level is reached before tape 42 has completed its rewinding operations from the previous write operation. Consequently, as soon as tape 42 has repositioned itself, it commences ramping up to write the data from buffer 34 to tape 42. Given that no host stall occurred, the buffer only reaching the level of 485 Kb, during write cycle #15 the buffer level is adjusted up to 270 Kb. Following the same operational pattern, during write cycle #16 the watermark is advanced to 280 Kb.

Although during this period of operation tape 42 may be going through a large number of repositionings, tape drive 26 has successfully adjusted to the increased data input rate and does not stall host computer 20, as was the case when the buffer with the fixed 430 Kb watermark received data at the rate of 500 Kbps, discussed in connection with FIG. 3.

Finally, at the end of write cycle #16, the data input rate from host computer 20 drops to 200 Kbps, at point 232, and, provided there are no host stalls, tape drive 26 will continue to advance the watermark of buffer 34 in the same manner as discussed above, for the purpose of again getting to the point where the rewinding and repositioning of tape 42 is minimized.

Through the present invention, tape drive 26 can adjust to mimic the optimal operating characteristics of a buffer with a fixed high or low watermark, depending on the data input rate. When the input data rate is low, such as 200 Kbps, the watermark gets adjusted high in order to take advantage of the maximum storage capacity of buffer 34 before tape 42 begins its winding operation. This saves tape 42 from unnecessary mechanical wear. In this respect, the buffer with an adjustable watermark behaves similar to the buffer with a fixed 430 Kb watermark when it is receiving data at a low rate, which is an optimal operating environment for the fixed 430 Kb watermark buffer. On the other hand, when the input data rate is high, such as 500 Kbps, the watermark gets adjusted low in order to insure that host stalls are minimized, even at the expense of a greater number of repositionings of tape 42. In this respect, the buffer with the adjustable watermark behaves similar to the buffer with a fixed 0 Kb watermark when it is receiving data at a high rate, which is an optimal operating environment for the fixed 0 Kb buffer. Thus the present invention implements an optimal watermark even in an environment where the input data rate may be changing.

Figure 5A:
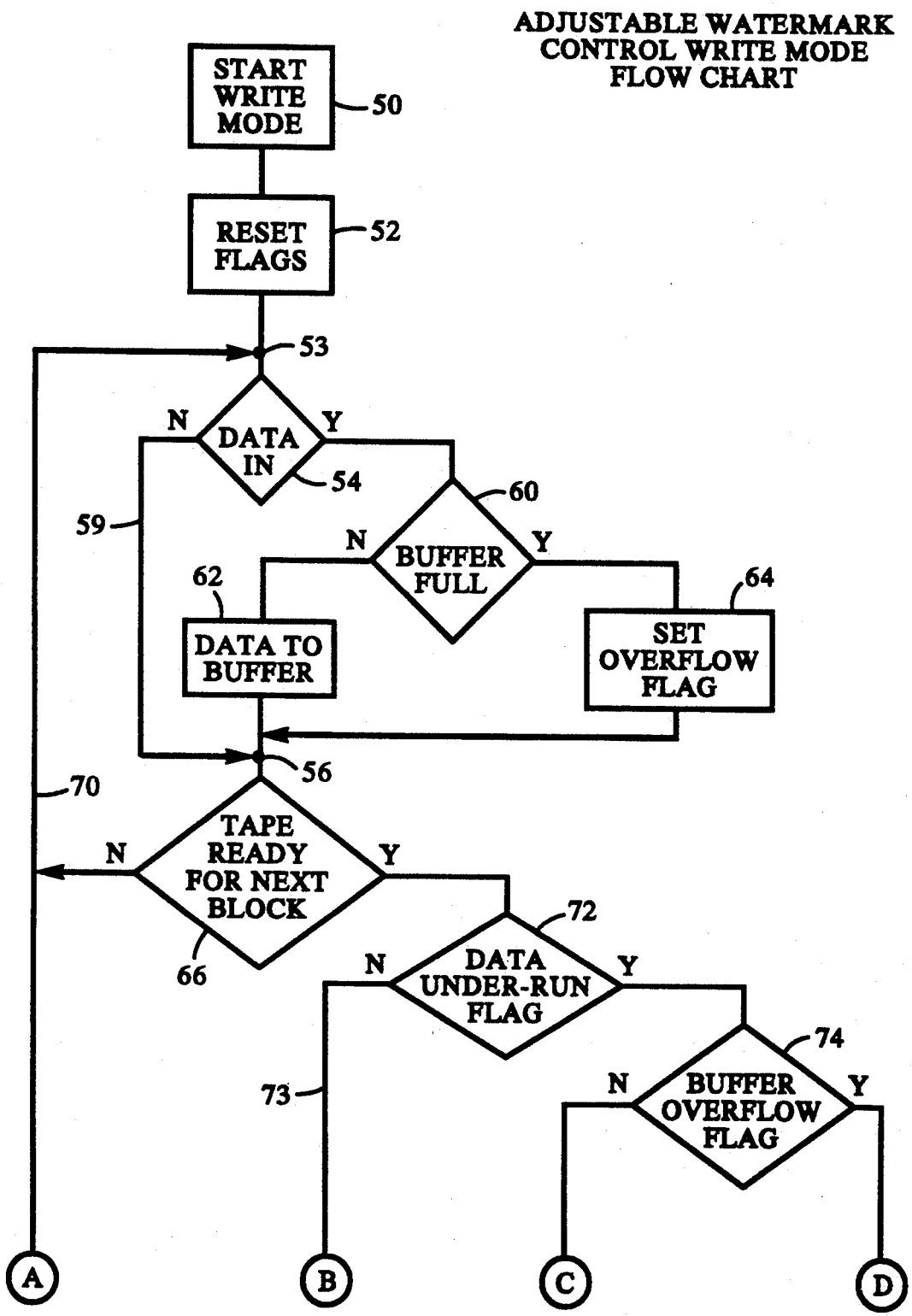
FIGS. 5a-5c, when set top to bottom, form a software flow diagram showing the logical flow of the software program that implements the monitoring of the tape drive's responsiveness to the host computer and the adjusting of the watermark during a write operation.
Figure 5B:
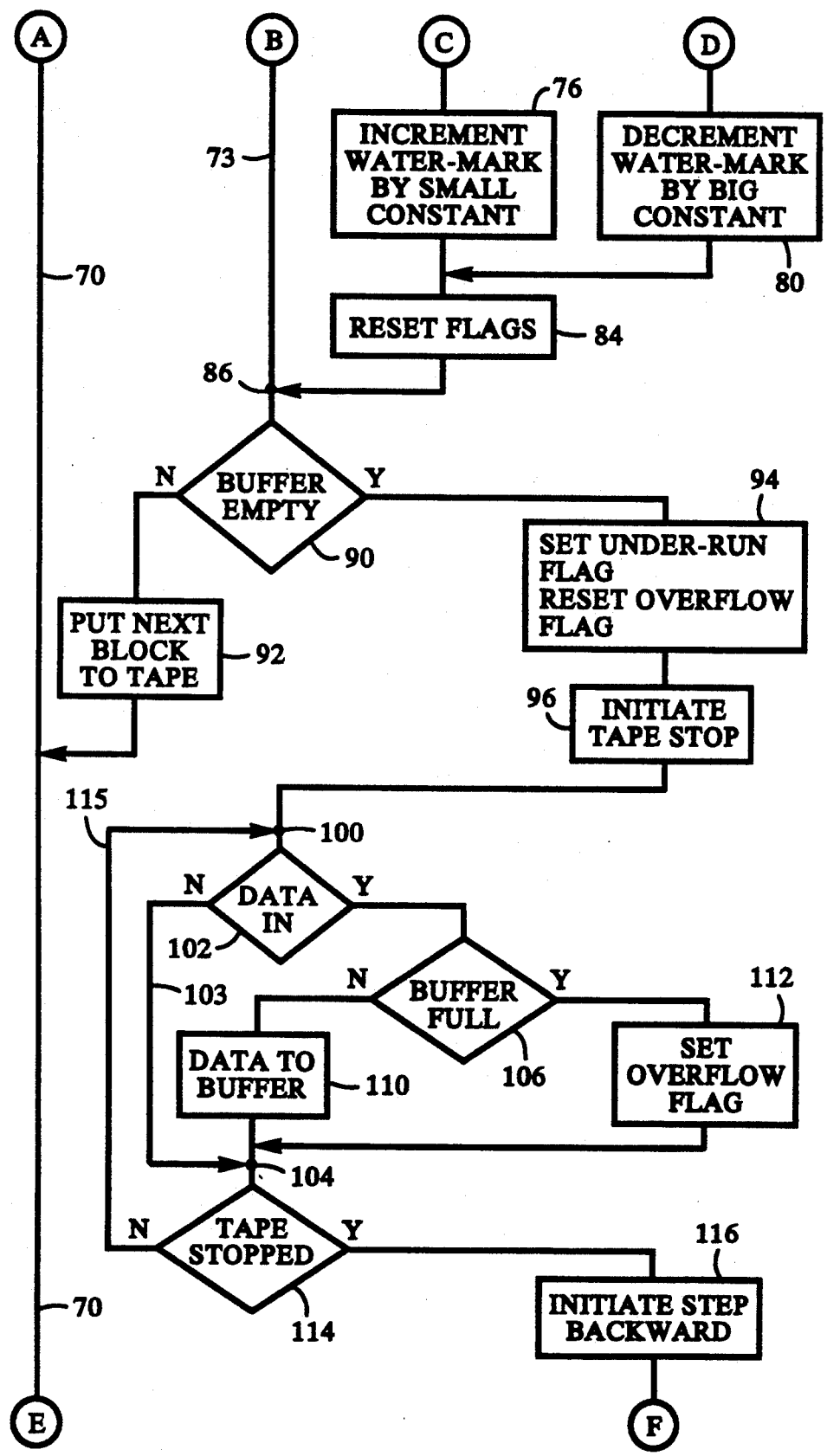
Figure 5C:
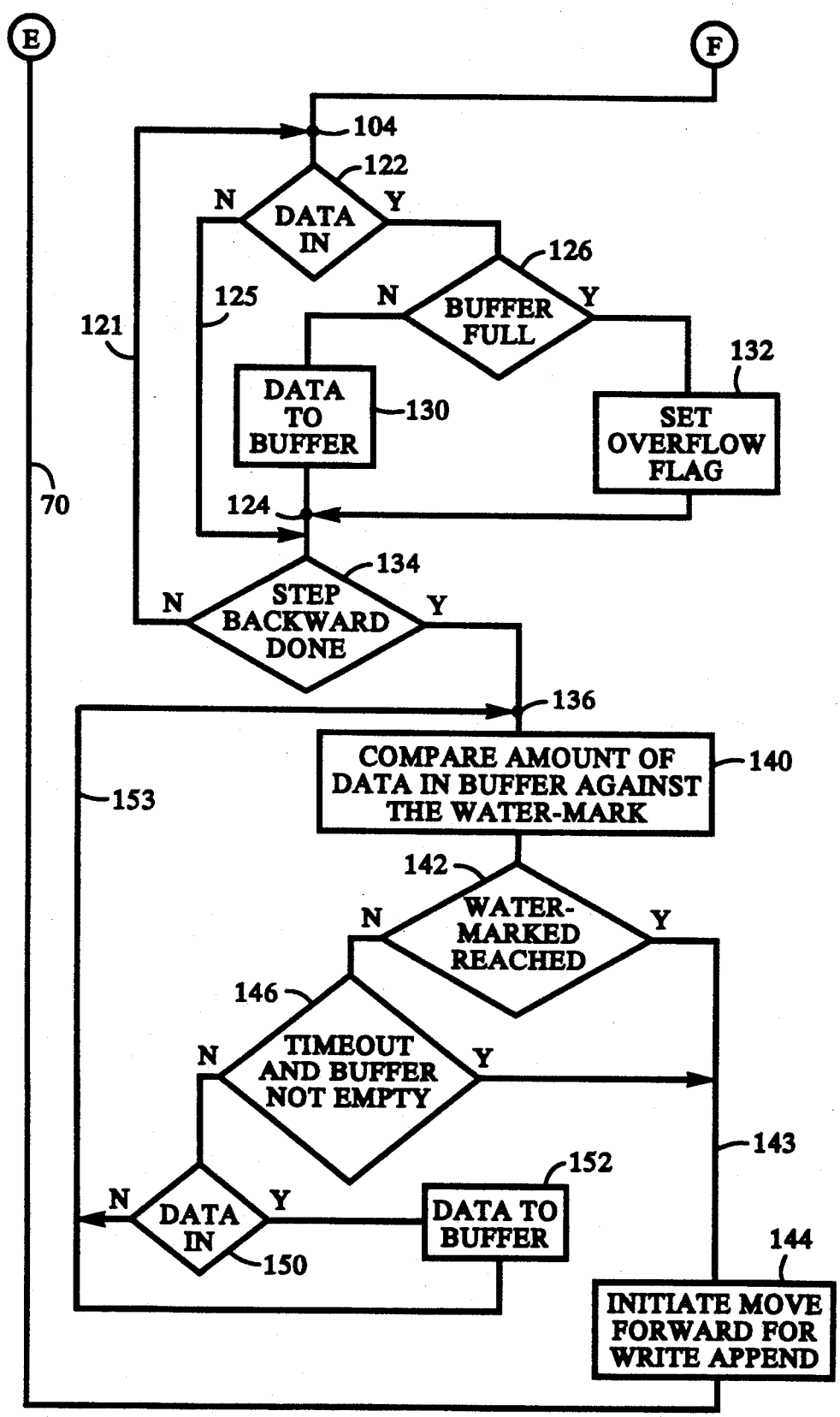

Referring now to FIG. 5, a flow diagram illustrating the implementation of the invention in a software program is shown. At the beginning of the flow diagram block 50 "Start Write Mode" indicates that host computer 20 has sent a write command to tape drive 26. (Reference numerals for the hardware elements of the system are shown on FIG. 1.) It should be noted that the commencement of the program with block 50 is from the time that tape drive 26 receives its first write command after it is powered up. Therefore, as mentioned in connection with the discussion of FIG. 4, the watermark of buffer 34 will initially be set at 0 Kb.

The program next resets an overflow flag and a under-run flag, as shown in block 52 "reset flags". Setting the overflow flag signals that buffer 34 was completely full with data at a time when host computer 20 wanted to send data to tape drive 26, which will result in host stall. On the other hand, setting the under-run flag signals that tape 42 is is still moving forward for the purpose of writing data while there is no data in buffer 34 that can be written. When reset, the flags indicate, respectively, that neither of these conditions exist.

After resetting the overflow flag and the under-run flag, the program next enters decision block 54 "data in" through which the program queries whether host computer 20 is sending data to tape drive 26. If the answer is no, the program follows path 59 to point 56 on FIG. 5. If, however, the answer is yes, then the program advances to decision block 60 "buffer full" through which the program queries whether buffer 34 is too full to accept any more data from host computer 20. If the answer to decision block 60 is no, then the program orders the data from host computer 20 to be stored in buffer 34, as shown by block 62 "data to buffer". If the answer is yes, however, buffer 34 is too full, then the overflow flag is set, shown in block 64, indicating that condition. Both blocks 62 and 64 lead to point 56 on FIG. 5.

Referring back to FIG. 4, one example of the operation of tape drive 26 during this portion of the program can be seen by focusing upon write cycle #1. As soon as host computer 20 sends data at the rate of 200 Kbps, as shown on the Input Rate line, decision block 54 would be answered in the affirmative indicating that host computer 20 was, in fact sending data. In next responding to decision block 60 by indicating that buffer 34 is not too full, the data from host computer 20 is stored in buffer 34, as is reflected on FIG. 4 by having the Buffer Level line increase.

Referring again to FIG. 5, from point 56 the program next enters decision block 66 "tape ready for next block" through which the program queries whether tape 42 is ready to receive the next block of data in buffer 34. If the answer is no, the program follows path 70 back to point 53, which will cause this subroutine of the program to continue looping until tape 42 is ready for the next block. At this point, it can be seen that if host computer 20 has started the program by initiating a write command, but has not yet sent any data, the program will continue looping in this subroutine. Namely, decision block 66 will continue to answer that tape 42 is not ready to write the data because without any data sent by host computer 20 there would be no reason for tape 42 to ramp up to its write velocity. Therefore, the program will continue to branch out of the negative side of decision block 66 and back up to point 53 over path 70.

If, however, tape 42 is not ready for data while data is being transferred from host computer 20, and buffer 34 fills up completely, then decision block 60 will be answered yes and the overflow flag will be set in block 64, which will signal to host computer 20 that it must stop sending data because buffer 34 cannot absorb it. This very condition occurred in FIG. 4 at write cycle #11, which was shown by the data input line dropping to 0 Kbps. During that write cycle, buffer 34 was full and tape 42 was not yet prepared to write; therefore host computer 20 stalled with its data.

Continuing with the program shown on FIG. 5, if decision block 66 is answered in the affirmative, the program next queries whether the data under-run flag is set through decision block 72. As can be seen by looking at block 52, the data under-run flag was reset at the very beginning of the program. From that point up to decision block 72 there has not been any program conditions which would have caused the data under-run flag to be set. On the other hand, it can be seen that there are other paths in the program that lead back to point 53, which will cause data under-run flag to be set. Therefore, the progression of the program in the event decision block 72 is answered yes will be postponed until those conditions are addressed below.

Assuming decision block 72 is answered no, the program follows path 73 and enters decision block 90 "buffer empty" at which point the program queries whether buffer 34 is empty. If it is not, the program next orders the data in buffer 34 to be written onto tape 42 through block 92 "put next block to tape". From block 92 the program will loop back up path 70 and re-enter the program at point 53 to continue the same program progression discussed above until the answer to decision block 90 is affirmative, indicating that buffer 34 is empty. It should be noted that at this point, the data under-run flag has still not been set through any program conditions that have occurred up to this point of the discussion; therefore, the program could not have yet progressed through the "yes" branch of decision block 72.

Again referring to FIG. 4 to see the relationship between the flow diagram and the operations of tape drive 26, after tape 42 has ramped up and synchronized, as shown on the Tape Velocity line during write cycle #1, tape 42 will begin to receive data from buffer 34 in a write operation. Thus, block 92 corresponds to the operation of writing data onto tape 42. Furthermore, as long as buffer 34 continues to have data in it, decision block 90 will be answered no, and tape 42 continues its write operation. The effects of that write operation on buffer 34 are shown on the Buffer Level line of FIG. 4 as it declines during write cycle #1. When the Buffer Level line finally reaches 0 and buffer 34 is empty, decision block 90 on FIG. 5 will be answered in the affirmative.

When buffer 34 is emptied and decision block 90 is answered in the affirmative, the program proceeds to set the under-run flag and reset the overflow flag in block 94 "set under-run flag/reset overflow flag", and to commence the stopping of tape 42 in block 96 "initiate tape stop". At this point in the program, buffer 34 has been emptied; therefore, any previous buffer overflows can be erased through the resetting of the overflow flag. The setting of the under-run flag is to signal that tape 42 is still winding even though there is no more data in buffer 34 to write. Therefore, the program next stops tape 42.

As discussed in connection with the characteristics of a streaming tape, tape 42 will gradually slow down and stop because its mechanical motor is not large enough to stop it immediately. This is reflected during write cycle #1 on FIG. 4, for example, by having the Tape Velocity line decline from its write velocity towards the Tape Velocity x-axis. During that gradual stopping period, it is possible that data may be sent by host computer 20 to tape drive 26. In fact, in connection with the discussion of FIG. 4 it was seen that at many points in time buffer 34 was completely emptied such that tape 42 stopped writing and slowed to a stop, even though as soon as buffer 34 was emptied it started to fill again because data kept coming from host computer 20. For example, at the end of write cycle #1 and the beginning of write cycle #2, it can be seen that while tape 42 is slowing down, host computer 20 is still sending data at the rate of 200 Kbps, shown on the Input Rate line, and buffer 34 is again filling up, shown on the Buffer Level line.

In order to account for this possibility, while tape 42 is stopping the program enters decision block 102 "data in" through which it queries whether host computer 20 is sending data. If the answer is no, the program follows path 103 to point 104 on FIG. 5. If, however, the answer to decision block 102 is yes, then the program advances to the next decision block 106 "buffer full" through which the program queries whether buffer 34 is too full to accept any more data from host computer 20. If the answer to decision block 106 is no, then the program orders the data from host computer 20 to be stored in buffer 34, as shown by block 110 "data to buffer". Again referring to FIG. 4 during write cycle #2, the Buffer Level line continues to increase, showing that during write cycle #2 decision block 106 was answered in the negative.

If the answer is yes, however, buffer 34 is too full, then the overflow flag is set, shown in block 112 "set overflow flag", which will cause host computer 20 to stop sending data. Both blocks 110 and 112 lead to point 104 on FIG. 5.

Continuing from point 104 the program enters decision block 114 "tape stopped" through which the program queries whether tape 42 has yet stopped its forward motion. If the answer is no, then the program follows path 115 to re-enter the program at point 100, and the same subroutine, commencing with decision block 102, will continue until tape 42 has stopped. The stopage of tape 42 is shown on FIG. 4 at the point where the Tape Velocity line intersects the Tape Velocity x-axis (i.e. the velocity of tape 42 is 0). When tape 42 is stopped, decision block 114, on FIG. 5, is answered in the affirmative and the program proceeds to block 116 "initiate step backwards" indicating that the program will then cause tape 42 to rewind. As explained, rewinding is necessary for the streaming tape in order not to waste space on tape 42. Again referring to FIG. 4, the rewinding of tape 42 is shown by the Tape Velocity line extending below the Tape velocity x-axis during write cycle #2.

While this mechanical rewinding is going on, the program enters a loop that is quite similar to the one starting with decision block 102. Namely, commencing with decision block 122 the program again queries whether host computer 20 is sending data to tape drive 42. If no, the program follows path 125 to point 124. If yes, the program goes through decision block 126 "buffer full", and blocks 130 "data to buffer" and 132 "set overflow flag", which serve the same program functions as discussed above in connection with decision block 106, and blocks 110 and 112, respectively. After the program enters decision block 134, it queries whether the rewinding of tape 42 is completed through decision block 134 "step backward done". If not, the program continues by looping back up to re-enter the program at point 120 over path 121. If yes, the program advances to block 140.

While tape 42 was rewinding, as shown on FIG. 4 during write cycle #2, data continued to come from host computer 20 at 200 Kbps, shown on the Input Rate line. While that rewinding occurred, the program looped through this subroutine, constantly storing the incoming data in buffer 34, as is reflected by the continuing increase in the Buffer Level line.

The purpose of both of these subroutines, the ones commencing with decision blocks 102 and 122, is to monitor host computer 20 to determine whether it wants to send data to tape drive 26 during the period of time that tape 42 is involved in its slow down and rewind mechanical operations. If it does, the program orders the data into buffer 34, unless and until buffer 34 is too full to accept any more data. If, at any time while tape 42 is stopping and rewinding, buffer 34 cannot accept any more data because it is too full, the overflow flag will be reset, through block 112 or 132, and host computer 20 will be forced into a stall.

Continuing on FIG. 5, after tape 42 has finished its backward movement, the program next enters block 140 "compare amount of data in buffer against watermark". Together with decision block 142 the program queries whether the watermark of buffer 34 has been reached. As stated above, the commencement of the program with block 50 indicates that the system is operating as if it is undertaking a write operation for the first time since tape drive 26 has been powered up. This has been done, in part, to show the features of the invention from this most basic, initial condition. To the extent that the program commences with the first write operation after power up, the watermark used in blocks 140, 142 at this stage of the program will be 0 Kb. Referring back to FIG. 4, it can be seen that the initial watermark in write cycle #1 was 0 Kb; thereafter it progresses to 10 Kb, then 20 Kb, and so on as discussed above.

In subsequent write operations, which occur after the first write operation after power up, blocks 140, 142 will perform their comparison of the data in buffer 34 against the watermark by referring to the last watermark used during the previous write operation.

If the answer to decision block 142 is yes and the watermark has been reached, the program follows path 143 to block 144 "initiate move forward for Write append" which will result in tape 42 ramping up so that tape drive 26 can write the data. Again using the operation of tape drive 26 shown on FIG. 4 as an example, during write cycle #2, the watermark is reached by the time tape 42 is finished rewinding. Therefore, without any delay, tape 42 begins ramping up to its write velocity as soon as it is rewound. If the answer to decision block 142 is no, the program progresses to decision block 146 "time out and buffer not empty" through which the program queries whether, even though the watermark has not been reached, enough time has passed such that buffer 34 should be emptied. Assuming that enough time has so passed, and there is some data in buffer 34, decision block 146 will be answered in the affirmative, and the program will advance to block 144, discussed above.

If decision block 146 is answered no, meaning no time out has yet occurred, the program progresses to decision block 150 "data in" through which the program again questions whether host computer 20 is sending data to tape drive 26. If yes, the data is sent to buffer 34, as shown by block 152 "data to buffer". Whether yes or no, the program will loop back over path 153 and re-enter the program at point 136 so that it can continue to test whether the watermark has been reached or a time out has occurred while there is some data in buffer 34. This loop will continue until the watermark is reached, or some data gets deposited in buffer 34, and a time out causes the program to progress to block 144.

An illustration of the continuous filling of buffer 34 while tape drive 26 waits for the watermark to be reached can be seen in write cycle #10 on FIG. 4, for example. During this write cycle, even though tape 42 has rewound and stopped, tape 42 does not ramp up immediately because the watermark is not reached until the buffer level is at 430 Kb. Therefore, between the time that tape 42 stopped rewinding and started writing in write cycle #10, the program loops through blocks 140, 142, 146, 150, and 152, and back to point 136 until the watermark is reached.

When the program advances to block 144, a write operation will be initiated and tape 42 will ramp up and sychronize as shown on FIG. 4 during write cycle #2, for example. In addition, the program will loop back along path 70 to re-enter the program at point 53 on FIG. 5, which is almost the very beginning of the program. Commencing with decision block 54 the program continues questioning whether host computer 20 is sending data to tape drive 26. The program will continue to loop and advance as discussed above. In particular, the program queries in decision block 66 whether tape 42 is ready for the next block of data, and, until it is, the program continues to store the incoming data in buffer 34.

Unlike the very beginning of the program, however, after tape 42 is ready for receiving the next block of data, and the program enters decision block 72, there will be an affirmative answer to decision block 72 as a result of the data under-run flag being set in block 94. This is that portion of the discussion of the program that was postponed above because at the time block 72 was first addressed there were no program conditions that could have caused the under-run flag to be set.

Given that the under-run flag is set, decision block 72 will be answered affirmatively, and the program will progress to decision block 74 "buffer overflow flag" through which the program questions whether the overflow flag is set. This could have occurred at any time after buffer 34 was emptied and the overflow flag was reset in block 94. More particularly, the setting of the overflow flag could have occurred while tape 42 was slowing down and stopping after writing, which would cause the overflow flag to be set in block 112; while tape 42 was rewinding, which would cause the flag to be set in block 132; or while tape 42 was sitting idle or ramping up to its write speed, which would cause the flag to be set in block 64.

If the answer to decision block 74 is no, meaning that buffer 34 was not too full to accept more data from host computer 20, then the program proceeds to block 76 "increment watermark by small constant" through which the watermark is advanced a small amount, the purpose of which has been as discussed in detail above. An illustration of this feature of the program is shown in FIG. 4 during write cycles ##1-4 in which host computer 20 is not stalled due to buffer 34 being too full. Therefore, when the program queries whether the buffer overflow flag was set in decision block 74 the answer will be no, causing the program to proceed to block 76 through which the watermark is increased by a small amount. Consequently, at the commencement of each respective write operation during write cycles ##1-4 the watermark is increased by 10 Kb.

On the other hand, if the answer to decision block 74 is yes, buffer 34 was too full, then the program moves to block 80 "decrement watermark by big constant", also discussed above. Again referring to FIG. 4 to illustrate this feature of the program, during write cycle #11, for example, buffer 34 was too full to accept further data from host computer 20 after tape 42 had commenced ramping up, but before it actually could write the data. Therefore, at some point between ramp up and writing the answer to decision block 60 was affirmative indicating that buffer 34 could absorb no more data, and the overflow flag was set through block 64 resulting in a host stall. On FIG. 4 this is shown by having the Input Rate line drop to 0 Kb, and having the Buffer Level line flatten at 500 Kb.

As a result of the setting of the overflow flag in write cycle #11 when the program progresses to decision block 74 and questions whether the overflow flag is set, the answer will be in the affirmative. Therefore, the program progresses to block 80, causing the watermark to be decremented by a large amount, which is shown in FIG. 4 during write cycle #11 by having the watermark drop 100 Kb, from 440 Kb to 340 Kb.

Commencing with decision block 74 and ending at point 86, the program addresses a key objective of the invention. In particular, this is the portion of the program which evaluates whether the watermark is too high or too low and adjusts it accordingly. If no buffer overflow occurred, the watermark will be increased in the interest of minimizing the mechanical movement of tape 42. On the other hand, if a buffer overflow occurred, then the watermark will be lowered to improve the likelihood that host computer 20 will not be stalled during the next write operation.

From either block 76 or 80, the program next proceeds to block 84 "reset flags" through which the data overflow flag and the data under-run flag are reset, so that any of the previous system conditions are erased from the flag settings, before the program proceeds from point 86 through the rest of the program in the same fashion as outlined above.

As stated above, the majority of operations in which tape drive 26 will be involved are write operations through which host computer 20 writes data onto tape 42. On the other hand, even though it may not occur as frequently, host computer 20 periodically reads data from tape 42. During a read operation, the present invention is implemented to adjust the watermark of buffer 34, again for the purpose of making sure that buffer 34 is always full enough with available data for host computer 20, thereby minimizing host stalls, and also for the purpose of minimizing the wear on the mechanical components of tape drive 26. Although in a read mode the system focuses more on buffer emptiness then buffer fullness, the principles of operation are basically the same as during a write operation. Therefore, the discussion of the read operation will be much more abbreviated than the discussion of the write operations.

Figure 6:
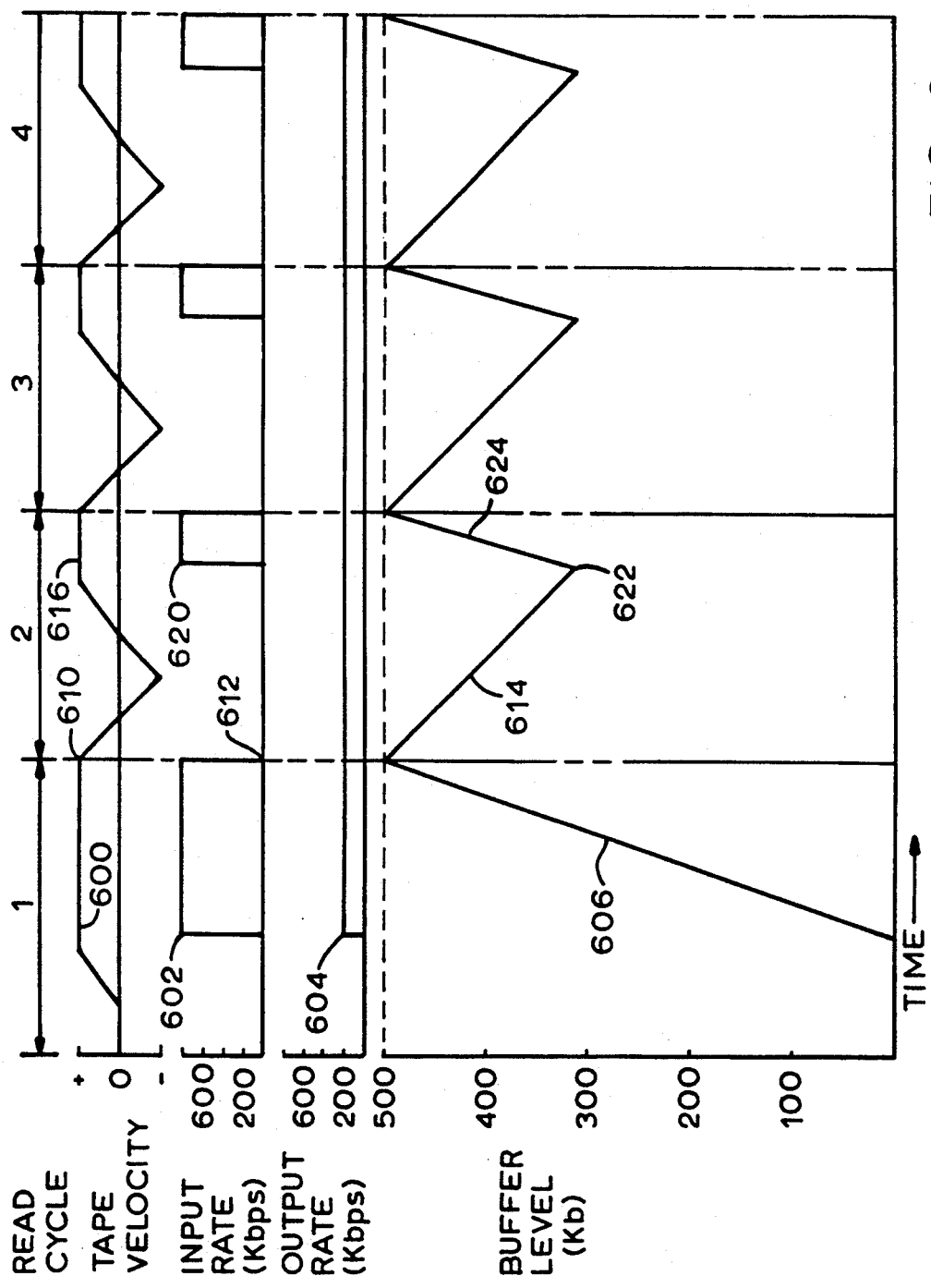
FIG. 6 is a timing diagram which shows curves depicting data transfer characteristics between a host computer, a buffer and a tape during a series of read operations, the buffer having a watermark fixed at 500 Kb.

FIG. 6 shows the same basic graph format presented in connection with FIGS. 2, 3, and 4. In this instance, however, along the y-axis of the diagram the five graph headings are: "Read Cycle" identifying the number of a given read cycle; "Tape Velocity" showing the speed and direction of tape 42; "Input Rate" showing the rate at which tape 42 is transferring data into buffer 34; "Output Rate" showing the rate at which buffer 34 is transferring data to host computer 20 over system bus 30; and "Buffer Level" showing the level of data in buffer 34 The x-axis of the graph is "Time".

FIG. 6 reflects the operation of a system that is configured as shown by the model in FIG. 1; however, in this instance the system has a watermark fixed such that during a read operation as soon as any storage space is available in buffer 34, the mechanical motor of tape drive 26 will begin ramping up tape 42 to read data from tape 42 into buffer 34. In other words, after buffer 34 is full and it starts to be emptied, as soon as there is some storage space available for additional data, tape 42 will ramp up immediately in preparation for filling that available space. Therefore, the system shown in FIG. 6 has a watermark fixed at 500 Kb and its behavior is similar to the buffer with the watermark fixed at 0 Kb, which began ramping up as soon as any data was deposited into buffer 34 during a write operation.

Referring now to read cycle #1 of FIG. 6, host computer 20 has requested data from tape drive 26. In response, tape 42 has ramped up and reached its read velocity, shown by point 600 on the Tape Velocity line. Simultaneous with tape 42 reaching its read velocity, the Input Rate line steps up to 800 Kbps, at point 602, reflecting that data is being input into buffer 34 by tape 42 at the rate of 800 Kbps. Also, simultaneous with data going into buffer 34 at 800 Kbps, data is being transferred to host computer 20 over system bus 30 at the rate of 200 Kbps, shown by the step increase on the Output Rate line at point 604. Finally, because the input rate exceeds the output rate, buffer 34 progressively fills up with data, shown by the incline of line segment 606 on the Buffer Level line.

After buffer 34 reaches its maximum, 500 Kb, the read operation of tape 42 ceases, shown at point 610 on the Tape Velocity line. Similarly, the input rate drops to 0 Kb, at point 612 on the Input Rate line, given that there is no more storage area available in buffer 34. Because host computer 20 continues to read data from buffer 34, shown by the continuation of the Output Rate line at 200 Kb, the buffer level continues to decline as shown by line segment 614 on Buffer Level line.

Given that the system shown in FIG. 6 has a fixed 500 Kb watermark for read operations, resulting in tape 42 reading data into buffer 34 as soon as there is any space available, tape 42 will immediately start to read additional data into buffer 34 as soon as it has repositioned itself. The repositioning of tape 42 is done in the same fashion as described in connection with a write operation, discussed above; namely, after reading data into buffer 34 during read cycle #1, tape 42 slows down, stops, rewinds, and repositions itself during read cycle #2, shown on the Tape Velocity line. Then, as soon as tape 42 is finished repositioning, it will ramp up again to read more data into buffer 34. On FIG. 6, the second read operation commences at point 616 on the Tape Velocity line, which coincides with point 620 on the Input Rate line and point 622 on the Buffer Level line. When the read operation commences in read cycle #2, buffer 34 again begins to fill which is shown by the incline of line segment 624 on the Buffer Level line. Thereafter, the graphs on FIG. 6 repeat the same basic pattern during read cycles ##3 and 4.

Although from FIG. 6 it can be seen that buffer 34 with a watermark fixed at 500 Kb for a read operation remains full with data, thereby not stalling host computer 20, it can also be seen that tape 42 is constantly rewinding and repositioning itself, which has the effect of excessively wearing the components of tape drive 26. Thus, the fixed watermark during a read operation causes the same type of difficulties as seen above with respect to write operations. These difficulties can be addressed by implementing an adjustable watermark for buffer 34, as was done in connection with write operations.

Figure 7A:
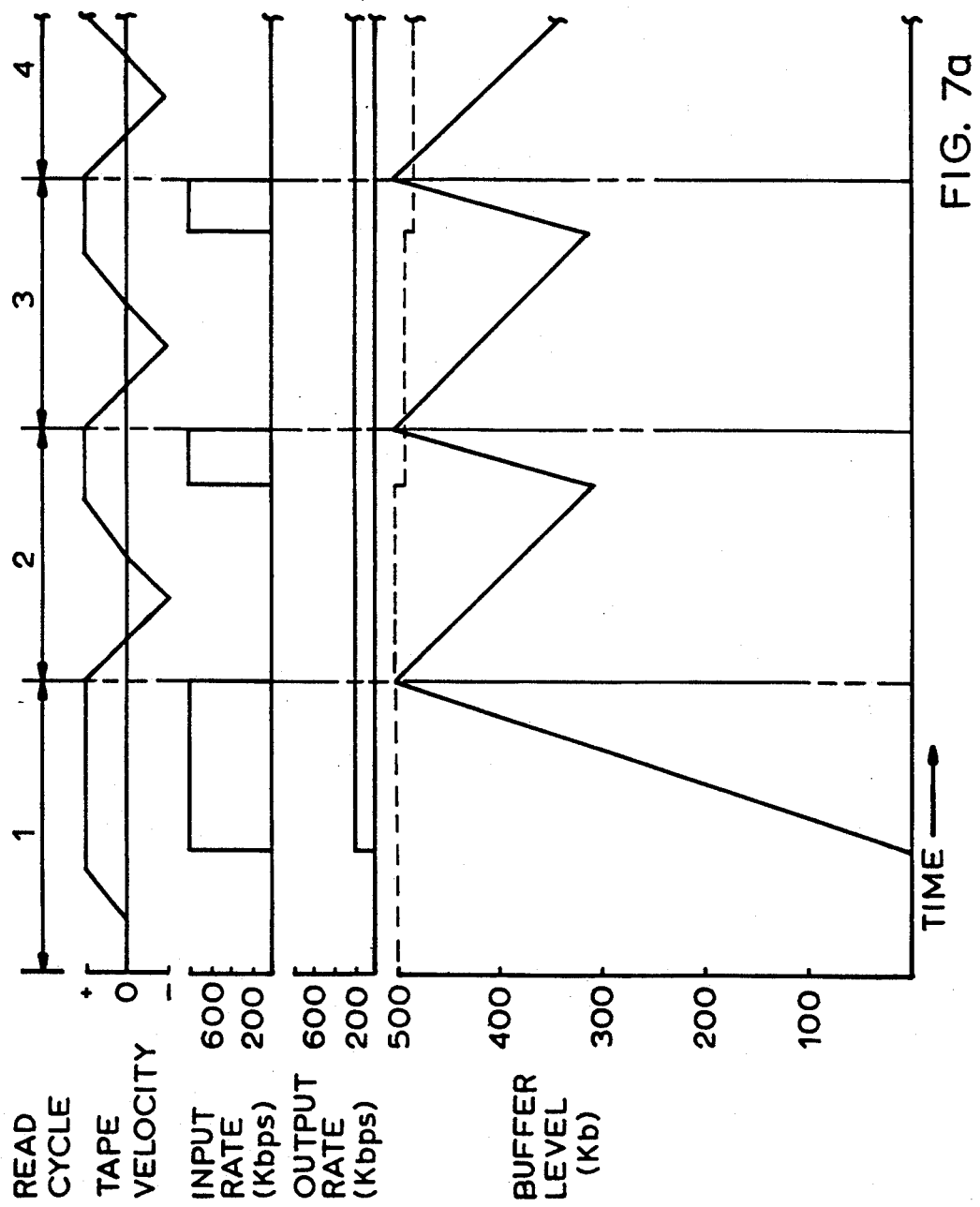
FIGS. 7a-7c, when set side by side lengthwise, form a timing diagram which shows curves depicting data transfer characteristics between a host computer, a buffer and a tape during a series of read operations, the buffer incorporating the present invention by having an adjustable watermark.
Figure 7B:
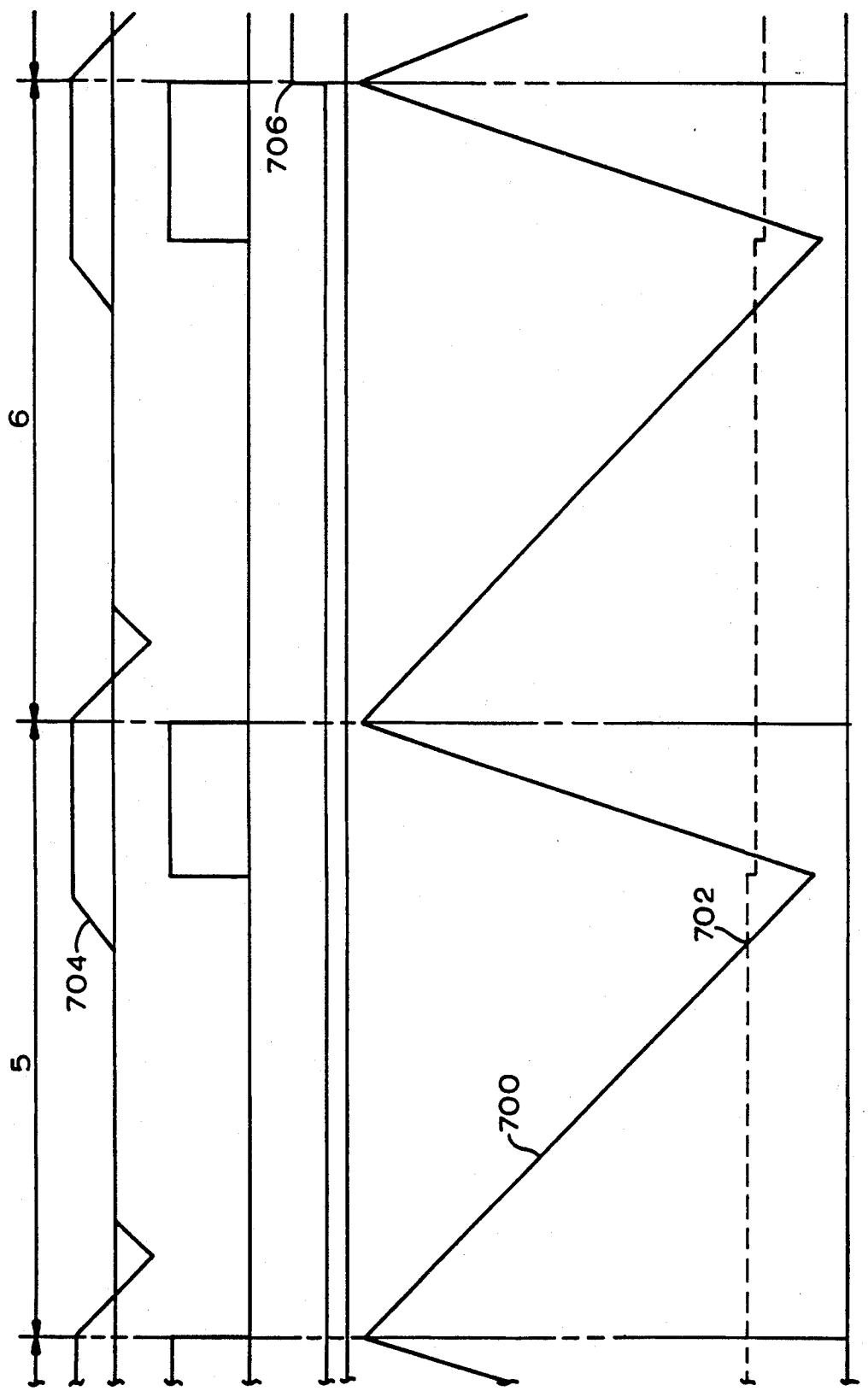
Figure 7C:
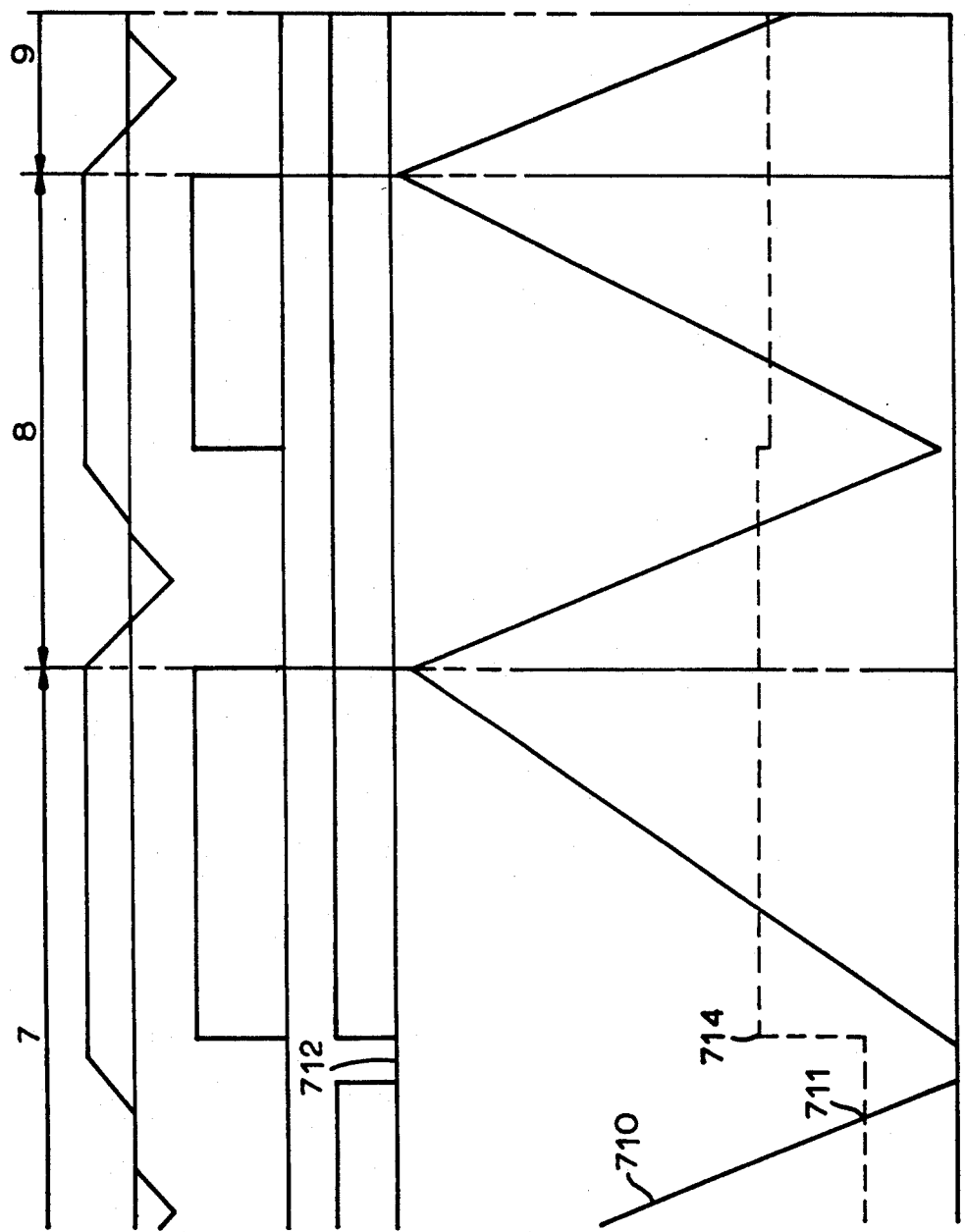

Now referring to FIG. 7, the same type of graph format and graph headings as in FIG. 6 is shown illustrating the operation of a system which has the same configuration as shown in FIG. 1; however, in this instance buffer 34 has an adjustable watermark that is implemented during read operations. Therefore, FIG. 7 reflects the operation of tape drive 26 taking advantage of the present invention.

During read cycles ##1-3 tape drive 26 with the adjustable watermark operates basically the same as the buffer with the fixed watermark discussed in connection with FIG. 6. Therefore, up until the break in the graph, FIG. 7 looks almost identical to FIG. 6, and tape drive 26 operates virtually the same. One significant difference, however, is that during read cycle #2, the present invention queries whether a host stall has occurred since buffer 34 was last filled. Since no stall has occurred, during read cycle #2, the watermark is dropped from 500 Kb to 490 Kb at the commencement of the read operation. Like FIGS. 3 and 4, the watermark of buffer 34 is shown with a dashed line running across the Buffer Level portion of FIG. 7. During read cycles ##3 and 4, the watermark is again dropped 10 Kb each time there was no host stall. Although during these early read cycles there are many tape repositionings, it will be seen that tape drive 26 is moving toward improved efficiency as the watermark is lowered.

After the break in FIG. 7, the watermark is shown to have progressed down to 100 Kb, meaning that tape 42 will not commence its mechanical rewind operations until buffer 34 has only 100 Kb of data in it. Specifically, when line segment 700 on the Buffer Level line crosses the 100 Kb watermark, shown by point 702 on the Buffer Level line, tape 42 begins ramping up to its read velocity, shown by the incline of line segment 704 on the Tape Velocity line. When tape 42 has reached its read velocity, it will then read more data into buffer 34 and buffer 34 will fill during the later part of read cycle #5.

As seen by looking at the Tape Velocity line during read cycles ##5 and 6, tape 42 is now going through its mechanical movements much less frequently than it did during read cycles ##1-4, as is evident by the spacing between these read operations. In this respect, the present invention again improves tape drive 26 by reducing the shoeshine on the tape and the wear on the tape heads through taking greater advantage of the storage capacity of buffer 34 than was taken when buffer 34 had a fixed 500 Kb watermark, discussed in connection with FIG. 6.

Given that at no time after buffer 34 was completely filled at the commencement of read operation #5 did tape drive 26 stall host computer 20, at the commencement of the read operation during read cycle #5 the watermark is again dropped 10 Kb, so that it is at 90 Kb. Therefore, at the commencement of read cycle #6 tape 42 will not begin its read operation until only 90 Kb are left in buffer 34. The watermark is similarly lowered by 10 Kb at the commencement of the read operation during read cycle #6.

Up to the end of read cycle #6, the rate at which host computer has been reading data from buffer 34 has been 200 Kbps, as shown by the level Output Rate line. Similar to the input rate of host computer 20 being increased to 500 Kbps in connection with the discussion of FIGS. 2, 3, and 4, above, at the commencement of read cycle #7, host computer 20 begins reading data out of buffer 34 at the rate of 500 Kbps, as shown by the step increase of the Output Rate line at point 706. Because of this output rate increase, the Buffer Level line declines with a steeper slope, shown by line segment 710, indicating that buffer 34 is being emptied faster during read cycle #7 than it was emptied in the previous read cycles. Moreover, because of this faster output rate and the watermark setting, tape 42 does not have enough time to ramp up to its reading velocity after the declining line segment 710 crosses the watermark at point 711, and triggers tape 42 to ramp up for reading. Host computer 20 consequently completely empties buffer 34, and therefore during read cycle #7 host computer 20 stalls, as shown by line segment 712 on the Output Rate line.

In accordance with the present invention, when the read operation commences during read cycle #7, tape drive 26 will adjust the watermark up by 100 Kb, shown by point 714 on FIG. 7, to improve the likelihood that the next read operation is completed without a stall. Therefore, at the commencement of read cycle #8 the watermark is at 180 Kb. It can be seen that during read cycles ##7-9, tape 42 is once again repositioning itself with greater frequency; however, this again reflects that the major objective of the invention is to improve system performance by always having data available to host computer 20 when it needs that data; in other words, minimizing the number of host stalls. The secondary objective is to reduce the wear of the components of tape drive 26, but not at the expense of degrading system performance.

Therefore, using the present invention, tape drive 26 has been able to adjust the watermark of buffer 34 to account for the varying reading rate of host computer 20. When the reading rate, shown on the Output Rate line, was relatively slow, such as 200 Kbps, the watermark could be kept lower to minimize the repositionings of tape 42. When the reading rate became higher, 500 Kbps for example, the watermark was moved higher to reduce the number of host stalls, even though additional repositionings would occur.

Finally, during read cycle #8, no host stall occurred, even at the higher reading rate of 500 Kbps, so tape drive 26 will again drop the watermark by 10 Kb, again seeking the optimal watermark for the given output rate.

As can now be seen, the operation of tape drive 26 using the adjustable watermark can be implemented for read and write operations, and in accordance with the preferred embodiment of the present invention tape drive 26 implements the invention with respect to both. Write operations occur far more frequently, and have therefore been discussed in much greater detail, but the fundamental method of operation for reads and writes is the same. In both instances, the system is monitored to determine whether the mechanical operation of tape 42 can be reduced in order to minimize the wear on its components. Most importantly, host stalls are monitored and the watermark is adjusted in the direction which is most likely not to cause a stall during the next tape operation; down in the case of write operations, and up in the case of read operations.

Furthermore, the invention has been detailed in connection with the operation of a tape drive; however, as explained above, it could also be implemented in other electromechanical devices which buffer data in some electronic memory, while relatively slower mechanical parts prepare to perform their function. One such alternate application could be a printer device which temporarily stores data in a buffer while a slower printing mechanism prepares to print that data on some medium, such as paper. Accordingly, the invention in its broader aspects is not limited to the specific details, representative apparatus, and illustrative examples shown and described herein. Thus, departures may be made from such details without departing from the spirit or scope of the invention.

What is claimed is:

1. A tape drive for storing data and adapted for delaying the transmission of data through a read or write transaction, said tape drive comprising:
    a tape for recording data said tape being mechanically moved whenever data is written to said tape by a host computer, or whenever data is read from said tape by the host computer;
    an electronic buffer coupled to said tape for temporarily storing data, said buffer having a threshold level for determining the amount of data in said buffer which initiates the mechanical movement of said tape so that said tape can ramp up to the velocity of which data can be transferred between said tape and said buffer;
    means for controlling the operation of said buffer and the mechanical movement of said tape, including controlling the transfer of data between said buffer and said tape; and
    means for responsively adjusting said threshold level, the adjustment being made on the basis of the occurrence or nonoccurrence of a delay in the transmission of data between said tape drive and the host computer.

2. The tape drive as in claim 1, wherein said controlling means comprises a microprocessor.

3. The tape drive as in claim 1, wherein said adjustment means comprises a microprocessor.

4. The tape drive as in claim 1, wherein said threshold level is adjusted upward if said tape drive did not delay the transmission of data from the host computer to said tape drive at any time since said buffer was last emptied through a write operation.

5. The tape drive as in claim 1, wherein said threshold level is adjusted downward if said tape drive delayed the transmission of data from the host computer to said tape drive any time since said buffer was last emptied through a write operation.

6. The tape drive as in claim 1, wherein said threshold level is adjusted downward if said tape drive did not delay the transmission of data from said tape drive to the host computer at any time since said buffer was last filled through a read operation.

7. The tape drive as in claim 1, wherein said threshold level is adjusted upward if said tape drive delayed the transmission of data from said tape drive to the host computer any time since said buffer was last filled through a read operation.

8. The tape drive as in claim 1 further comprising an electronic memory in which a program may be stored, said program being used by said adjustment means for adjusting said threshold level.

9. An apparatus for the storage of data comprising:
    an electronic buffer adapted for connection between a host computer and a tape on which data is recorded, said buffer being for temporarily storing data transferred between the host computer and the tape, and said buffer having a threshold level for determining the amount of data in said buffer which initiates the mechanical movement of the tape so that the tape can ramp up to the velocity at which it can transfer data between the tape and said buffer, either through a write or a rear operation;
    transmission delaying means, responsive to the amount of data in said buffer, for delaying the transmission of data between the host computer and said apparatus; and
    means for responsively adjusting said threshold level, said adjustment being made on the basis of the occurrence or nonoccurrence of a data transmission delay between the host computer and said apparatus.

10. The apparatus as in claim 9, wherein said threshold level is adjusted upward if said delaying means did not cause a transmission delay at any time since said buffer was last emptied through a write operation.

11. The apparatus as in claim 9, wherein said threshold level is adjusted downward if said delaying means caused a transmission delay at any time since said buffer was last emptied through a write operation.

12. The apparatus as in claim 9, wherein said threshold level is adjusted downward if said delaying means did not cause a transmission delay at any time since said buffer was last filled through a read operation.

13. The apparatus as in claim 9, wherein said threshold level is adjusted upward if said delaying means caused a transmission delay at any time since said buffer was last filled through a read operation.

14. The apparatus as in claim 9, wherein said delaying means comprises a microprocessor.

15. The apparatus as in claim 9, wherein said adjustment means comprises a microprocessor.

16. The apparatus as in claim 15, wherein said adjustment means further comprises an electronic memory in which a program may be stored, said program being used by said microprocessor to establish and adjust said threshold level.

17. An apparatus for storing data, said apparatus adapted for connection to a host node for the host node to read data from or write data to said apparatus, and said apparatus adapted for delaying the transmission of data through a read or write transaction, said apparatus comprising:
    means for recording data, said recording means requiring some period of time ("t") after said recording means is signaled to initiate a read or write operation to actually perform the read or write operation, where t is greater than the amount of time it takes for a storing means coupled to said recording means to receive data from either the host node or said recording means;

means for temporarily storing data coupled to said recording means, said storing means having a threshold level for determining the amount of data in said storing means which initiates a transfer of data to or from said recording means, either through a write or read operation;

means for controlling the operation of said storing means and said recording means, said controlling means being for signaling to said recording means to initiate a read or write operation; and means for responsively adjusting said threshold level, the adjustment being made on the basis of the occurrence or nonoccurrence of a delay in the transmission of data between said apparatus and the host node.

18. The apparatus as in claim 17, wherein said controlling means comprises a microprocessor.

19. The apparatus as in claim 17, wherein said adjusting means comprises a microprocessor.

20. The apparatus as in claim 17, wherein said threshold level is adjusted upward if said apparatus did not delay the transmission of data from the host node to said apparatus at any time since said storing means was last emptied through a write operation.

21. The apparatus as in claim 17, wherein said threshold level is adjusted downward if said apparatus delayed the transmission of data from the host node to said apparatus any time since said storing means was last emptied through a write operation.

22. The apparatus as in claim 17, wherein said threshold level is adjusted downward if said apparatus did not delay the transmission of data from said apparatus to the host node any time since said storing means was last filled through a read operation.

23. The apparatus as in claim 17, wherein said threshold level is adjusted upward if said apparatus delayed the transmission of data from said apparatus to host node any time since said storing means was last filled through a read operation.

24. The apparatus as in claim 17, further comprising an electronic memory in which a program may be stored, said program being used by said adjustment means to establish and adjust said threshold level for said storing means.

25. The apparatus as in claim 17, wherein said storing means comprises an electronic buffer.

26. The apparatus as in claim 17, wherein said recording means comprises a tape drive.

27. The apparatus as in claim 17, wherein said recording means comprises a printer.

28. An apparatus for the storage of data, said apparatus comprising:

storing means adapted for connection between a host node and a data recording means for temporarily storing data transferred between the host node and the recording means, said storing means having a threshold level for determining the amount of data in said storing means which initiates a transfer of data to or from the recording means, either through a write or read operation;

transmission delaying means, responsive to the amount of data in said storing means, for delaying the transmission of data between the host node and said apparatus; and means for responsively adjusting said threshold level, the adjustment being made on the basis of the occurrence or nonoccurrence of a data transmission delay between the host node and said apparatus.

29. The apparatus as in claim 28, wherein said threshold level is adjusted upward if said delaying means did not delay the transmission of data from the host node to apparatus at any time since said storing means was last emptied through a write operation.

30. The apparatus as in claim 28, wherein said threshold level is adjusted downward if said delaying means delayed the transmission of data from the host node to said apparatus at any time since said storing means was last emptied through a write operation.

31. The apparatus as in claim 28, wherein said threshold level is adjusted downward if said delaying means did not delay the transmission of data from said apparatus to the host node at any time since said storing means was last filled through a read operation.

32. The apparatus as in claim 28, wherein said threshold level is adjusted upward if said delaying means delayed the transmission of data from said apparatus to the host node at any time since said storing means was last filled through a read operation.

33. The apparatus as in claim 28, wherein said delaying means comprises a microprocessor.

34. The apparatus as in claim 28, wherein said adjusting means comprises a microprocessor.

35. The apparatus as in claim 34, wherein said adjusting means further comprises an electronic memory in which a program may be stored, said program being used by said microprocessor to establish and adjust said threshold level.

36. The apparatus as in claim 28, wherein said storing means comprises an electronic buffer.

37. The apparatus as in claim 28, wherein said recording means comprises a tape drive.

38. The apparatus as in claim 28, wherein said recording means comprises a printer.

39. A method for establishing and adjusting threshold level for an electronic buffer in a tape drive, said buffer being a means for temporarily storing data written by a host computer to the tape, and said threshold level being for determining the amount of data in the buffer which initiates the mechanical movement of the tape to ramp up to the velocity of which the tape can receive data transferred from the buffer to the tape, said method comprising the steps of:

establishing a threshold level for the buffer at the commencement of the first write transaction after the tape drive is powered up;

temporarily storing data written by the host computer to the tape drive in the buffer;

ramping up the tape to its write velocity as soon as the amount of data in the buffer reaches the threshold level;

testing whether the tape drive caused the host computer to delay the transfer of data to the tape drive at any time since the buffer was last empty;

writing all of the data from the buffer to the tape as soon as the tape has reached its write velocity;

adjusting the previously established threshold level upwards if at the time the data began being written out of the buffer the tape drive had not delayed the transmission of data to the host computer the delay occurring at any time since the buffer was last empty;

adjusting the previously established threshold level downwards if at the time the data began being written out of the buffer the tape drive had delayed the transmission of data to the host computer, the delay occurring at any time since the buffer was last empty; and repositioning the tape for a subsequent write operation.

40. The method as in claim 39 further comprising the step of:

repeating the steps commencing with said storing step.

41. The method as in claim 39, wherein the amount of said downward adjustment is larger than the amount of said upward adjustment.

42. A method for establishing and adjusting a threshold level for an electronic buffer in a tape drive, said buffer being a means for temporarily storing data read by a host computer from a tape, and said threshold level being for determining the amount of data in the buffer which initiates the mechanical movement of the tape to ramp up the tape to the velocity at which the tape can transfer data from the tape into the buffer, said method comprising the steps of:

establishing a threshold level for the buffer at the commencement of the first read transaction after the tape drive is powered up;

temporarily storing data read by the host computer from the tape drive in the buffer;

ramping up the tape to its write velocity as soon as data stored in the buffer reaches the threshold level;

testing whether the tape drive delayed the transmission of data to the host computer at any time since the buffer was last filled;

transferring all of the data from the buffer to the host computer through a read operation;

adjusting the previously established threshold level downward if at the time the data began being read from the buffer by the host computer the tape drive had not delayed the transmission of data to the host computer, the delay occurring at any time since the buffer was last filled;

adjusting the previously established watermark upwards if at the time the data began being read from the buffer by the host computer the tape drive had delayed the transmission of data to the host computer, the delay occurring at any time since the buffer was last filled; and repositioning the tape for a subsequent read operation.

43. The method as in claim 42, further comprising the step of:

repeating the steps commencing with said storing step.

44. The method as in claim 42 wherein the amount of said upward adjustment is larger than the amount of said downward adjustment.

45. A tape drive for storing data on a tape, and adapted for delaying the transmission of data through a read or write transaction in the event that a host computer, which is coupled to the tape drive, is ready to transfer data to or from said tape drive through one of a series of data transfer operations, but said tape drive is not ready to perform the transfer operation, said tape drive comprising:

a tape on which data is recorded, said tape being mechanically moved to effect a data transfer to and from the host computer;

an electronic buffer for temporarily storing data, said buffer adapted for coupling between said tape and the host computer;

means for establishing a threshold level within said buffer, said threshold level being the amount of data in said buffer which initiates the mechanical movement of said tape so that said tape can ramp up to the velocity at which data can transferred between said tape and said buffer; and means for adjusting said threshold level for said buffer in response to the occurrence or nonoccurrence of a delay in the transmission of data between the host computer and said tape drive during a previous data transfer.

46. The tape drive according to claim 45 further including means controlling the transfer of data between said buffer and said tape.

47. The tape drive according to claim 46, wherein said controlling means includes a microprocessor.

48. The tape drive according to claim 45, wherein said adjustment means includes a microprocessor.

49. The tape drive according to claim 45, wherein the data transfer operation is a write transaction and said threshold level is adjusted upward if said tape drive did not delay the transmission of data between said tape drive and the host computer at any time since said buffer was last emptied through the immediately preceding write operation.

50. The tape drive according to claim 45, wherein the data transfer operation is a write transaction and said threshold level is adjusted downward if said tape drive delayed the transmission of data between said tape drive and the host computer at any time since said buffer was last emptied through the immediately preceding write operation.

51. The tape drive according to claim 45, wherein the data transfer operation is a read transaction and said threshold level is adjusted downward if said tape drive did not delay the transmission of data between said tape drive and the host computer at any time since said buffer was last filled through the immediately preceding read operation.

52. The tape drive according to claim 45, wherein the data transfer operation is a read transaction and said threshold level is adjusted upward if said tape drive delayed the transmission of data between said tape drive and the host computer any time since said buffer was last filled through the immediately preceding read operation.

53. The tape drive according to claim 45, further comprising an electronic memory in which a program may be stored, said program being used by said adjustment means for adjusting said threshold level for said buffer.

* * * * *